US012354023B2

(12) United States Patent
Beran et al.

(10) Patent No.: US 12,354,023 B2
(45) Date of Patent: *Jul. 8, 2025

(54) PRIVATE ARTIFICIAL INTELLIGENCE (AI) MODEL OF A USER FOR USE BY AN AUTONOMOUS PERSONAL COMPANION

(71) Applicant: Sony Interactive Entertainment Inc., Tokyo (JP)

(72) Inventors: Erik Beran, Redwood, CA (US); Michael Taylor, San Mateo, CA (US); Masanori Omote, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,893

(22) Filed: Oct. 30, 2023

(65) Prior Publication Data

US 2024/0062081 A1 Feb. 22, 2024

Related U.S. Application Data

(63) Continuation of application No. 15/724,011, filed on Oct. 3, 2017, now Pat. No. 11,803,764.

(Continued)

(51) Int. Cl.
*G06N 5/025* (2023.01)
*G05B 23/02* (2006.01)
(Continued)

(52) U.S. Cl.
CPC ......... *G06N 5/025* (2013.01); *G05B 23/0216* (2013.01); *G05B 23/0294* (2013.01);
(Continued)

(58) Field of Classification Search
CPC .................. G06N 5/025; G06N 5/02
See application file for complete search history.

(56) References Cited

U.S. PATENT DOCUMENTS

| 11,803,764 | B2 * | 10/2023 | Beran | G06F 11/3438 |
| 2015/0365449 | A1 * | 12/2015 | Kurata | G06F 3/04883 |
|  |  |  |  | 715/757 |
| 2017/0039336 | A1 * | 2/2017 | Bitran | G16H 20/70 |

OTHER PUBLICATIONS

Ning et al (A Gradient-based Adaptive Learning Framework for Efficient Personal Recommendation, Aug. 2017, pp. 23-31) (Year: 2017).*

(Continued)

*Primary Examiner* — George Giroux
(74) *Attorney, Agent, or Firm* — Kilpatrick Townsend & Stockton LLP

(57) ABSTRACT

A method for building an artificial intelligence (AI) model. The method includes accessing data related to monitored behavior of a user. The data is classified, wherein the classes include an objective data class identifying data relevant to a group of users including the user, and a subjective data class identifying data that is specific to the user. Objective data is accessed and relates to monitored behavior of a plurality of users including the user. The method includes providing as a first set of inputs into a deep learning engine performing AI the objective data and the subjective data of the user, and a plurality of objective data of the plurality of users. The method includes determining a plurality of learned patterns predicting user behavior when responding to the first set of inputs. The method includes building a local AI model of the user including the plurality of learned patterns.

20 Claims, 21 Drawing Sheets

Related U.S. Application Data

(60) Provisional application No. 62/566,170, filed on Sep. 29, 2017.

(51) Int. Cl.
  *G06F 11/34*   (2006.01)
  *G06N 3/008*   (2023.01)
  *G06N 3/04*    (2023.01)
  *G06N 3/08*    (2023.01)
  *G06N 5/02*    (2023.01)
  *G06N 20/00*   (2019.01)
  *H04L 67/50*   (2022.01)

(52) U.S. Cl.
  CPC ......... *G06F 11/3438* (2013.01); *G06N 3/008* (2013.01); *G06N 3/04* (2013.01); *G06N 3/08* (2013.01); *G06N 5/02* (2013.01); *G06N 20/00* (2019.01); *H04L 67/535* (2022.05)

(56) References Cited

OTHER PUBLICATIONS

Wan et al. (Modeling Ambiguity, Subjectivity, and Diverging Viewpoints in Opinion Question Answering Systems, Dec. 2016, pp. 489-498) (Year: 2016).*
Erlingsson et al. (RAPPOR: Randomized Aggregatable Privacy-Preserving Ordinal Response, Nov. 2014, pp. 1054-1067) (Year: 2014).*
Saunders et al. ("Teach Me—Show Me"—End-User Personalization of a Smart Home and Companion Robot, Feb. 2016, pp. 27-40) (Year: 2016).*
McMahan et al. (Communication-Efficient Learning of Deep Networks from Decentralized Data, Feb. 2017, pp. 1-11) (Year: 2017).*
McMahan et al. (Federated Learning: Collaborative Machine Learning without Centralized Training Data, Apr. 2017, pp. 1-7) (Year: 2017).*
Konečný et al. (Federated Optimization: Distributed Machine Learning for On-Device Intelligence, Oct 2016, pp. 1-38) (Year: 2016).*
Gross et al. (Robot Companion for Domestic Health Assistance: Implementation, Test and Case Study under Everyday Conditions in Private Apartments, Oct. 2015, pp. 5992-5999) (Year: 2015).*

* cited by examiner

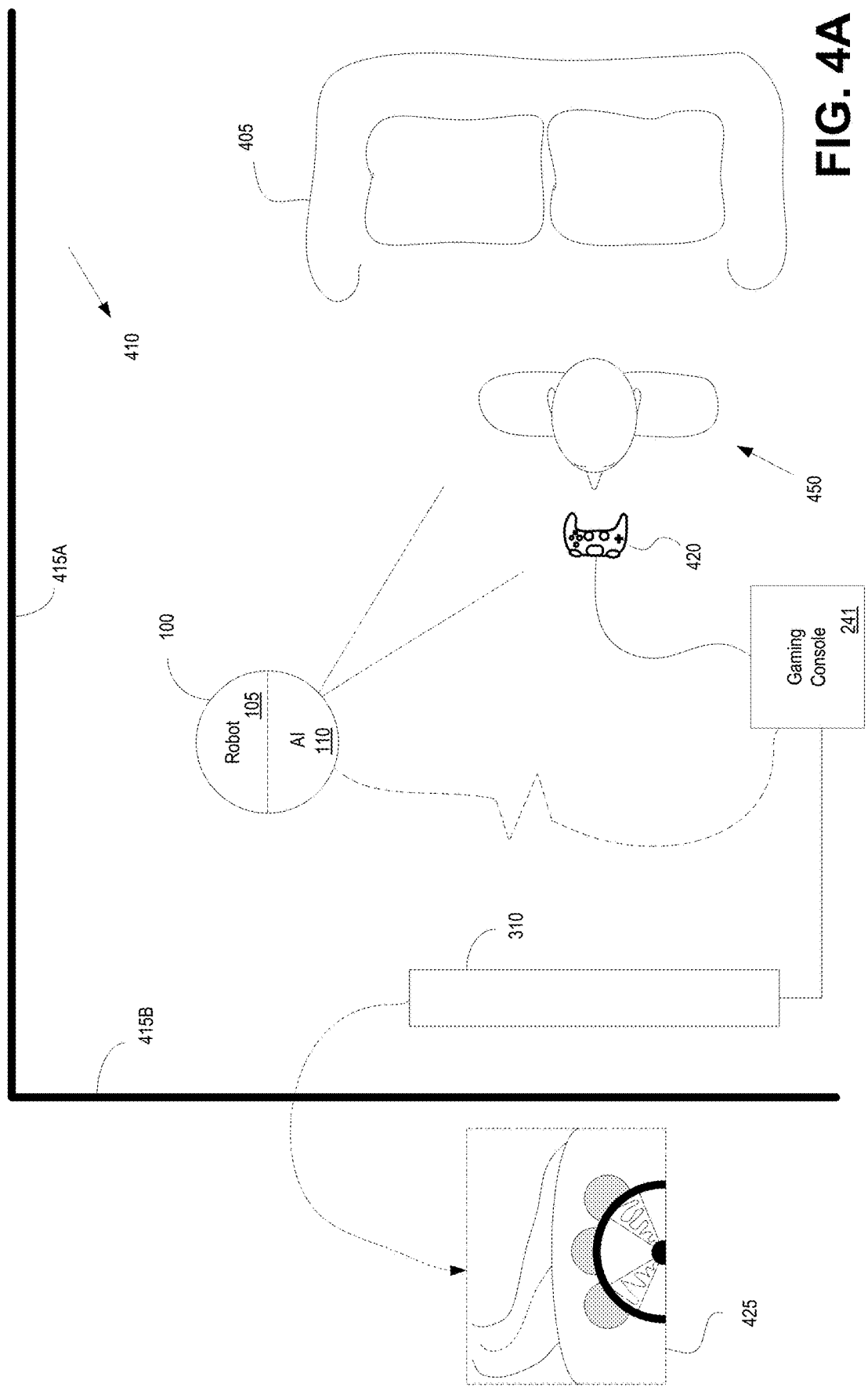

600A

PRIVATE ARTIFICIAL INTELLIGENCE (AI) MODEL OF A USER FOR USE BY AN AUTONOMOUS PERSONAL COMPANION

CLAIM OF PRIORITY

The present application claims priority to and the benefit of the commonly owned, provisional patent application U.S. Ser. No. 15/724,011, with filing date Oct. 3, 2017, entitled "MOBILE AND AUTONOMOUS PERSONAL COMPANION BASED ON AN ARTIFICIAL INTELLIGENCE (AI) MODEL FOR A USER"; which claims priority to and the benefit of the commonly owned, provisional patent application, U.S. Ser. No. 62/566,170, with filing date Sep. 29, 2017, entitled "MOBILE AND AUTONOMOUS PERSONAL COMPANION BASED ON AN ARTIFICIAL INTELLIGENCE (AI) MODEL FOR A USER," all of which are herein incorporated by reference in their entireties.

TECHNICAL FIELD

The present disclosure is related to intelligent robots, and more specifically to an automated companion personalized to a user that is implemented within an autonomous robot, and is also related to the building and implementation of the companion through artificial intelligence.

BACKGROUND OF THE DISCLOSURE

Robots are here. They are ready to interact with their human owners for a variety of reasons. These robots continue in a long line of robotic assistants, including robotic pets that were designed to provide companionship to their owners. Despite their limited processing power and restricted form factors, these early robotic pets could still move around somewhat autonomously, sense the immediate environment, have programmable intelligence for performing tasks, and interact (e.g., speak, bark, touch, etc.) with their human owners. These early robotic pets featured computer capabilities, vision sensor system, and articulators to facilitate one or more features, such as intelligence, object sensing, personality, and movement. For example, these robotic pets could interact with objects (e.g., ball), communicate with its owners, interact with its environment, play with its owners, travel about, etc. Also, these robotic pets could be programmed to participate in robot soccer leagues. Moreover, these robotic pets could grow and mature as the owners raised them through interaction. Also, these robotic pets could form personalities based on how they were raised.

These early robots are ready to reach the next level of capabilities to include, in part, increased intelligence, awareness, assistance, interaction, personality, and movement.

It is in this context that embodiments of the disclosure arise.

SUMMARY

Embodiments of the present disclosure relate to systems and methods for an autonomous personal companion implemented through an artificial intelligence (AI) model of a user, in accordance with one embodiment of the present disclosure. The AI model is built through a deep learning engine that is configured for providing contextually relevant personalized assistance to a user. The AI model can be configured to be aware of and exchange data with other digital assets (e.g., phone contacts, calendar, phone, home automation, gaming console, etc.) operating under different proprietary operating systems. The AI model can be integrated into a mobile platform and configured to move autonomously to position itself to best receive data, collect data, sense the environment, and deliver data. The AI model can interact with a back-end server for processing, wherein the AI model can process requests at a local level, or pre-process requests at a local level and then fully process those requests at the back-end server.

In one embodiment, a method for building an artificial intelligence model (AI) giving a personality to an autonomous personal companion providing services to a corresponding user is disclosed. The method includes accessing data related to monitored behavior of a user. The method includes classifying the data by class, wherein the classes include an objective data class identifying data relevant to a group of users including the user, and a subjective data class identifying data that is specific to the user. The method includes accessing objective data that is related to monitored behavior of a plurality of users including the user. The method includes providing as a first set of inputs into a deep learning engine performing AI the objective data of the user, the subjective data of the user, and a plurality of objective data of the plurality of users. The method includes determining a plurality of learned patterns predicting user behavior when responding to the first set of inputs. The method includes building a local AI model of the user including the plurality of learned patterns.

In another embodiment, a non-transitory computer-readable medium storing a computer program for building an artificial intelligence model (AI) giving a personality to an autonomous personal companion providing services to a corresponding user is disclosed. The computer-readable medium includes program instructions for accessing data related to monitored behavior of a user. The computer-readable medium includes program instructions for classifying the data by class, wherein a plurality of classes includes an objective data class identifying objective data relevant to a group of users including the user, and a subjective data class identifying subjective data that is specific to the user. The computer-readable medium includes program instructions for accessing objective data related to monitored behavior of a plurality of users including the user. The computer-readable medium includes program instructions for providing as a first set of inputs into a deep learning engine configured to perform artificial intelligence (AI) the objective data of the user, the subjective data of the user, and a plurality of objective data of the plurality of users. The computer-readable medium includes program instructions for determining a first plurality of learned patterns predicting user behavior when responding to the first set of inputs. The computer-readable medium includes program instructions for building a local AI model of the user comprising the first plurality of learned patterns.

In still another embodiment, a computer system is disclosed, wherein the computer system includes a processor and memory coupled to the processor and having stored therein instructions that, if executed by the computer system, cause the computer system to execute a method. The method as executed by the computer system includes accessing data related to monitored behavior of a user. The method includes classifying the data by class, wherein a plurality of classes includes an objective data class identifying objective data relevant to a group of users including the user, and a subjective data class identifying subjective data that is specific to the user. The method includes accessing objective data related to monitored behavior of a plurality of users including the user. The method includes providing as a first set of inputs into a deep learning engine configured to perform artificial intelligence (AI) the objective data of the user, the subjective data of the user, and a plurality of objective data of the plurality of users. The method includes determining a first plurality of learned patterns predicting user behavior when responding to the first set of inputs. The method includes building a local AI model of the user comprising the first plurality of learned patterns.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 4A illustrates an autonomous personal companion supporting the game play of a user playing a gaming application, in accordance with one embodiment of the present disclosure.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods implementing deep learning (also referred to as machine learning) techniques to build an AI model personalized to a user. The AI model is implemented through an autonomous personal companion that is mobile, wherein the autonomous personal companion is configurable to provide contextually relevant and personalized assistance to the user; to be aware of and exchange data with other digital assets operating under different proprietary platforms; to move autonomously through an environment to best receive or collect or deliver data; to move autonomously to best sense and/or map the environment; as well as other features. In some implementations, the autonomous personal companion is configurable to interact with a back-end server for processing, wherein the AI model is distributed at the autonomous personal companion and at the back-end server, and is configurable to process requests at the local level, or pre-process requests at a local level and then fully process those requests at the back-end server.

With the above general understanding of the various embodiments, example details of the embodiments will now be described with reference to the various drawings.

Figure 1A:
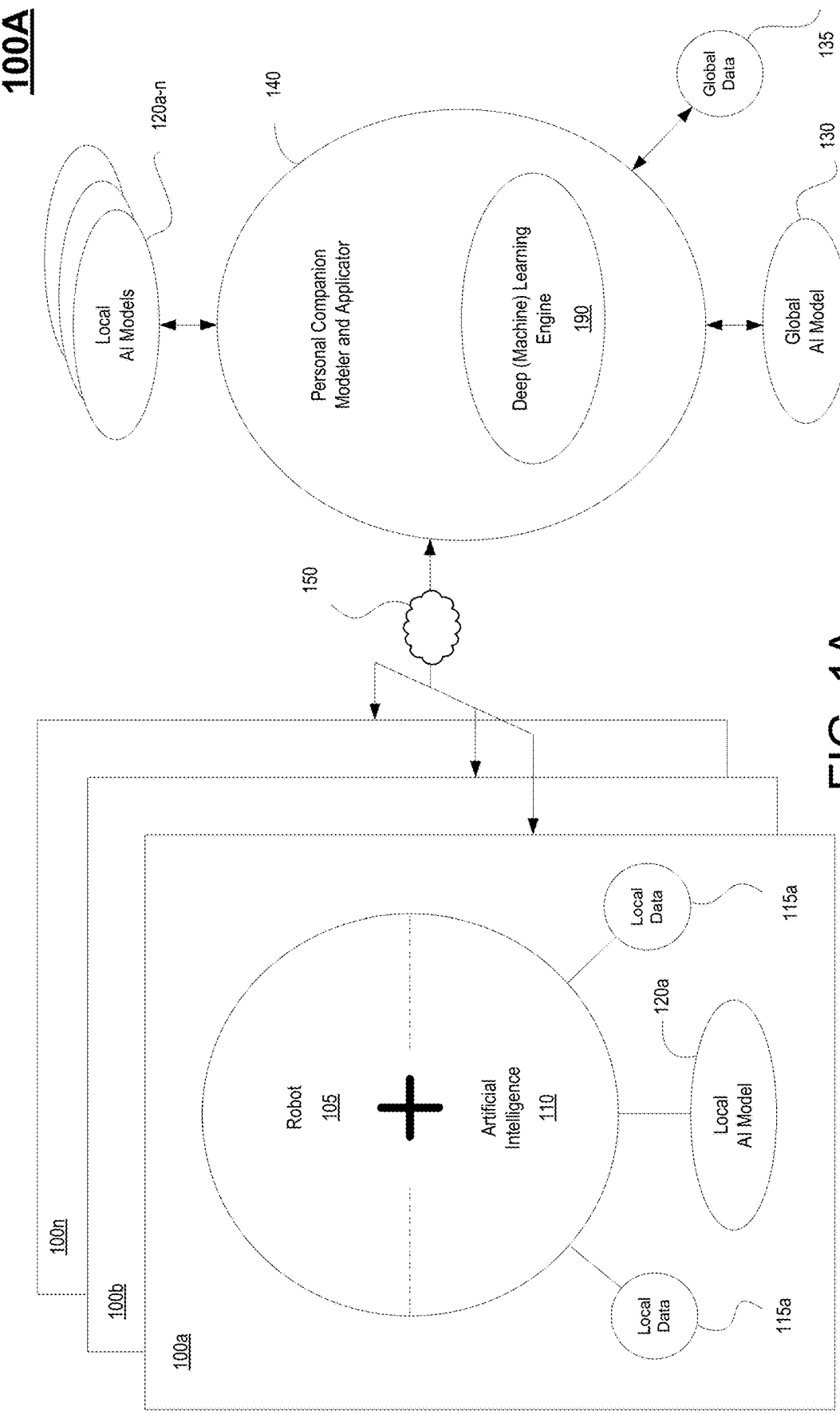
FIG. 1A is an illustration of an autonomous personal companion implemented through an artificial intelligence (AI) model of a user, in accordance with one embodiment of the present disclosure.

FIG. 1A illustrates a system 100A used for building and implementing autonomous personal companions that are implemented through corresponding AI models of users, in accordance with embodiments of the present disclosure. In particular, an autonomous personal companion 100 is configured to interface with a corresponding user as a digital companion, for example to provide services to the user. In addition, the autonomous personal companion 100 may be supported by a back-end server (e.g., personal companion modeler and applicator 140) through a network 150 (e.g., internet), wherein the back-end server provides artificial intelligence and/or deep, machine learning (e.g., through the deep, machine, learning engine 190) for building and applying personalized AI models, each of which correspond to its respective user. For example, one or more companions 100a-100n are configured to support multiple users in one or more locations throughout the world.

Each autonomous personal companion 100 is configured to provide multiple capabilities that provide services for (e.g., support) its respective user. In general, the companion 100 may provide its services at the request of the user, or may autonomously provide services or offer services to the user at appropriate times (e.g., sensing a need by the user, or determining contextually relevant actions, random generation, etc.). For example, the autonomous personal companion 100 may be configured to provide digital assistance to the user, such as processing user search requests that perform various operations (e.g., search for information, purchase goods and/or services, etc.); autonomously generate search requests relevant to the user; autonomously generate actions that are contextually relevant to the user (e.g., purchasing potato chips through an electronic commerce vendor after noticing that the pantry is bare and a party was held the previous night); provide gaming assistance to the user playing a gaming application (e.g., providing tips and aids that are helpful in navigating through a corresponding gaming application); extend the displayed gaming space of a gaming application by integrating the three dimensional (3D) gaming space within the physical world, as well as other features.

In addition, the autonomous personal companion 100 may provide companionship to the user, such as hold a conversation with the user, provide digital assistance to the user, build a relationship with the user through conversations, and accompany the user throughout a period of time or multiple periods of time. The companion 100 may prompt the user to respond, much like a human or animal companion would. For example, the companion 100 may suggest beginning a game of cards to be played between the companion 100 and user, or may suggest watching digital content on a display (e.g., fixed display remote from or a display integrated with the companion 100), or may bring over a game controller to prompt the user to playing a gaming application.

At least some of the actions performed by the autonomous personal companion 100 are contextually relevant to the user. That is, because the companion 100 is contextually aware of the environment that the user is currently engaged in and is able to build and/or access an AI model that is personal to the user, the actions generated by the companion 100 can be tailored to a context within which the user is experiencing. For example, when the user makes a seemingly generic request (e.g., "What was the score last night?"), based on the AI model for the user and the current date, the companion 100 would determine the current context for that request and provide the appropriate and relevant response: "Warriors win 101-97." The response is contextually relevant, because the AI model defines the user as a fan of the Warriors, and wherein the user only keeps up with the Golden State Warrior games in the National Basketball Association. Further, the response is contextually relevant to the user because the AI model also defines the user as an NBA fan in the month of April during playoffs, and one who is not concerned with any scores from other sports. Because the current date is one in April, the score for the Warriors from the night before can be searched through the internet by the companion 100.

As shown in FIG. 1A, numerous personal companions 100a-100n are configured to interface with corresponding users as their respective digital companions. For purposes of brevity and clarity, companion 100a is described, and the description is representative of the features provided in companions 100a-100n. In particular, each companion is implemented within a robot 105 that is mobile, wherein the robot may take on any suitable form factor. Each companion is supported through artificial intelligence 110 that may be distributed both locally in the robot 105 and at the back-end server 140. In one embodiment, AI 110 is configured for deep learning that is used to build at least a portion of a local AI model 120a used for providing, in part, services to a corresponding user. This information that is learned using AI 110 may or may not be shared with the back-end server 140 that may also be tasked with building the local AI model 120a depending on the type of information that is collected and/or learned. For example, sensitive information may be processed locally to build the local AI model 120a, but may not be shared with the back-end server 140.

In addition, the AI 110 of companion 100a includes a version of the local AI model 120a, wherein model 120a is personal to the corresponding user, and wherein AI 110 is configured for implementing the AI model 120a. In particular, the term "local AI model" is used to indicate that the AI model corresponds to a particular or localized user. The local AI model 120a stored within the form factor of robot 105 may be a full version of the AI model, or may be a base model that autonomously provides some subset of the capabilities available with the full version of the AI model. The full version of the AI model is also stored and accessible by the back-end server 140 providing AI modeling and application. As such, companion 100a may function independent of the back-end server 140, and provide either a full set of capabilities (if the full version of the local AI model is stored at robot 105), or a limited set of capabilities (if a lesser version of the local AI models is stored at robot 105). On the other hand, companion 100a may function in cooperation with the back-end server 140, and provide the full set of capabilities provided by the local AI model 120a. For example, the local AI model 120a at the robot 105 works cooperatively (e.g., may pre-process data) with the local AI model 120a at the back-end server 140 which is better configured (faster and more resources) to perform most of the AI processing.

As shown in FIG. 1A, local data 115a is collected by companion 100a, such as by robot 105. The local data 115a may be used by the AI 110 at the robot 105 to help build the local AI model 120a, using whatever AI capabilities are stored at robot 105. In addition, the local data 115a may be delivered to the personal companion modeler and applicator at the back-end server 140 to build the local AI model 120a, using the AI capabilities of the deep, machine learning engine 190. As shown, one or more local AI models 120a-n are generated and stored at the back-end server 140 for supporting one or more users.

Because the local data 115 for each of the companions 100a-100n is delivered to the personal companion modeler and applicator at the back-end server, each of the local data may be aggregated to generate a global AI model 130. The aggregated local data may be stored as global data 135.

Figure 1B:
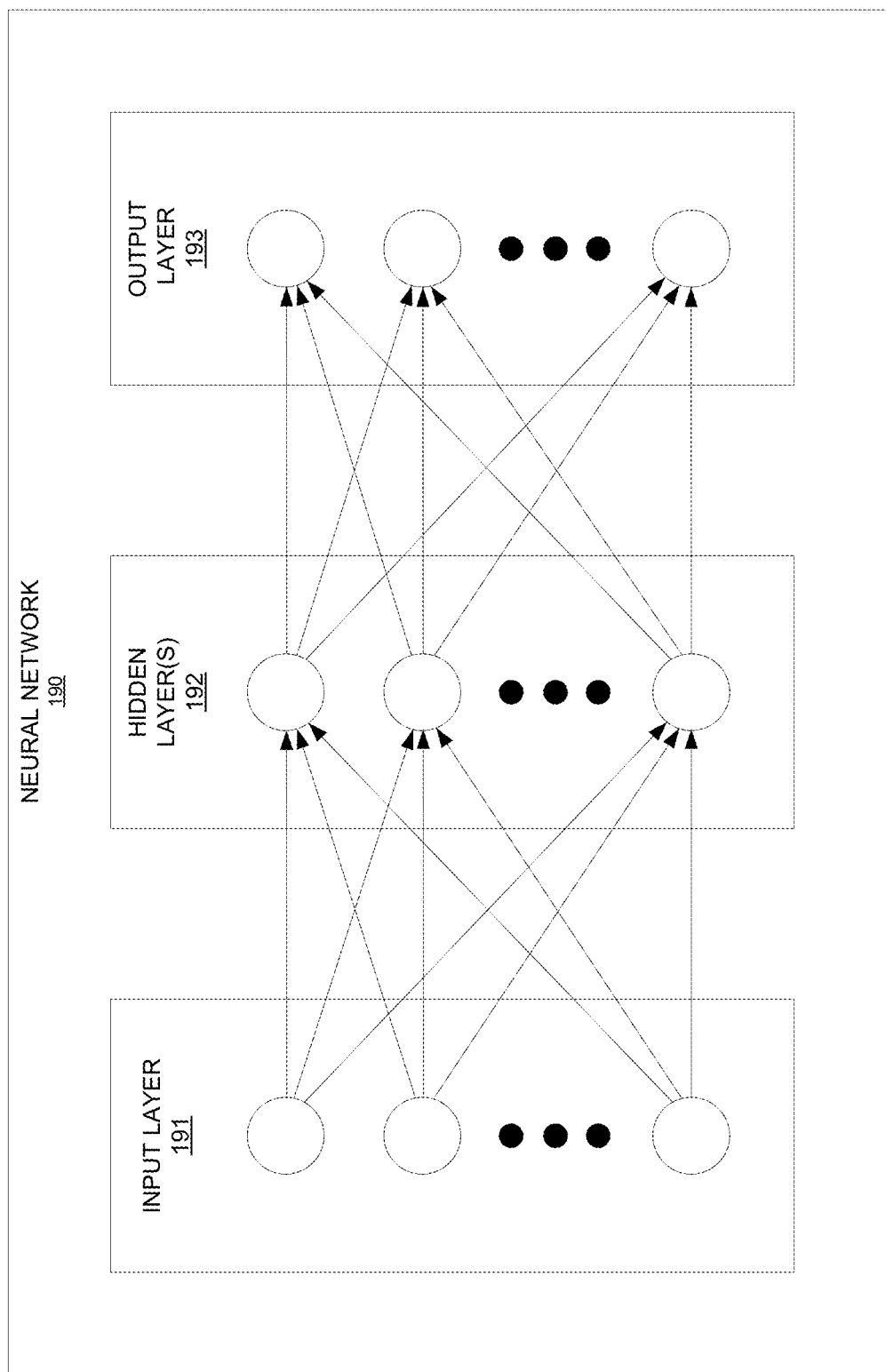
FIG. 1B illustrates an example neural network used to build an AI model of a user, wherein the AI model is used to implement an autonomous personal companion for a user, in accordance with one embodiment of the present disclosure.

FIG. 1B illustrates an example neural network used to build a local AI model for a corresponding user through training implemented by the deep learning engine 190 of the personal companion modeler and applicator 140, in accordance with one embodiment of the present disclosure. In particular, the modeler and applicator 140 in system 100A of FIG. 1A is configured to learn everything about the user that is useful and suitable for when the autonomous personal companion 100 provides services to the user. In addition, the neural network may be implemented within the AI 110 of companion 100, in one embodiment. The resulting local AI model 120 for the user defines, in part, the behaviors, biometrics, actions, emotions, expectations, desires, likes, wants, needs, and the environment (for providing context) of and relevant to the user. The personal companion modeler and applicator 140 may be any computing device, including a back-end server computing device that is coupled to each of the autonomous personal companions 101a-101n directly or through a network (e.g., local network, internet, etc.).

Specifically, the deep learning or machine learning engine 190 in the modeler 140 is configured to analyze local data 115 pertinent to the user, wherein the local data 115 is collected, in part, by the autonomous personal companion 100. The local data 115 is collected in association with monitoring the user (e.g., controller inputs, requests, actions, behaviors, responses, etc.), as well as the environment of the user. As will be described below, the companion 100 is configured with various features (e.g., camera, active actuators, passive sensors, controllers, mouse, scanners, etc.) that monitor and/or make request for purposes of collecting data. Basically, any relevant information associated with the user may be collected and used, in part, to define the user, and to understand the context within which the user is present, and to predict how the user feels, will act or respond to various conditions and/or stimuli. As such, the deep learning engine 190 is able to learn everything about the user so that a corresponding local AI model 120 can provide the best services for the user, and wherein the services are provided with minimal input by the user. For example, the AI model 120 can be used (e.g., through implementation of the deep learning engine 190) to understand requests made by the user, to predict what the user will need or may want, and provide services that satisfy those requests and predictions.

In addition to the local data 115, other data (e.g., global data 135) may be utilized and/or collected by the plurality of personal companions 100a-n and also used in building the local AI model 120 for the corresponding user. Basically, the global data 135 is the aggregation of all the local data 115 collected for all the users. In particular, some data may be generic and suitable for use when building all AI models for all users, or at least some subset (of various sizes) of users. In addition, the global data 135 may be used to build a global AI model 130, that may be used generally for any user. Further, the global data 135 may be used to build various global AI models, each of which are targeted to a particular grouping of users (e.g., grouped through demographics, region, music tastes, schooling, etc.).

As such, the local data 115 and some portion of global data 135 are fed to the deep learning engine 190. The deep learning engine 190 utilizes artificial intelligence, including deep learning algorithms, reinforcement learning, or other artificial intelligence-based algorithms to build the local AI model 120 for the corresponding user.

In that manner, during the learning and/or modeling phase, the data is used by the deep learning engine 190 to predict the reactions, actions, wants, and/or needs for a given user given a set of input data. These reactions, actions, wants and/or needs may be generally classified as user behavior, and as such, the AI model 120 can be used to generally predict behavior of a corresponding user given some input data. For example, the input data may be a specific request by the user, wherein the AI model 120 is used to generate a response, and wherein the response is related to services provided by the autonomous personal companion 100. In addition, the input data may be a collection of environmental data that irrespective of any directed user input or request may be used to predict the reactions, actions, wants and/or needs of the user. For example, the AI model 120 may be used to predict what services the user may want and/or need without the user having to explicitly deliver a request.

Over time, the AI model 120 can predict the behavior, actions, responses, wants and/or needs of a user in response to an approximate set of input data. For example, in the previously introduced example, a user is interested only in NBA scores in the month of April, and as such, any request for a sporting score of a game is used to predict the wants and needs of the user to include understanding that the user is a Golden State Warriors fan, and that in the month of April that user is only interested in scores from games played by the Warriors, all of which leads to a response (e.g., as implemented through the AI model 120) with the score for the latest game played by the Warriors. Other examples are useful in describing the building of the AI model 120. For example, the AI model 120 can be used to define certain biometrics of the user. In one case, the gait of the user can be defined, such that the personal companion can sense and track the footfall of an approaching person, and determine that it is the corresponding user associated with the AI model 120. The AI model 120 can be used to determine that at 5:00 μm, the user typically returns home, and sits down to watch digital content. As such, the personal companion 100 may upload content that is of interest to the user lately (e.g., binge watching a medical drama show) to a display already playing, or ready for play at the request of the user to the companion 100.

The neural network 190 represents an example of an automated analysis tool for analyzing data sets to determine the responses, actions, behavior, wants and/or needs of a corresponding user. Different types of neural networks 190 are possible. In an example, the neural network 190 supports deep learning that may be implemented by deep learning engine 190. Accordingly, a deep neural network, a convolutional deep neural network, and/or a recurrent neural network using supervised or unsupervised training can be implemented. In another example, the neural network 190 includes a deep learning network that supports reinforcement learning. For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. For example, each of these input nodes is mapped to local data 115 collected actively through actuators or passively by sensors during monitoring and/or querying of the user and the environment associated with the user by the autonomous personal companion 100.

At the highest hierarchical level, an output layer 193 exists. The output layer 193 includes a set of output nodes. An output node represents a decision (e.g., prediction) that relates to one or more components of a local AI model 120, for example. As previously described, the output nodes may identify the predicted or expected responses, actions, behaviors, wants and/or needs of the user for a given set of inputs, wherein the input may define various scenarios (e.g., direct requests, time of day, various patterns of behavior, etc.). These results can be compared to predetermined and true results obtained from previous interactions and monitoring of the user and/or environment in order to refine and/or modify the parameters used by the deep learning engine 190 to iteratively determine the appropriate predicted or expected responses, actions, behaviors, wants and/or needs of the user for a given set of inputs. That is, the nodes in the neural network 190 learn the parameters of the AI model 120 that can be used to make such decisions when refining the parameters.

In particular, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network 190 adaptive to inputs and capable of learning.

Generally, the hidden layer 192 allows knowledge about the input nodes to be shared among all the tasks corresponding to the output nodes. To do so, a transformation $f$ is applied to the input nodes through the hidden layer 192, in one implementation. In an example, the transformation $f$ is non-linear. Different non-linear transformations $f$ are available including, for instance, a rectifier function $f(x)=\max(0,x)$.

The neural network 190 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network 190 can be from a same data domain. For instance, the neural network 190 is trained for learning the predicted or expected responses, actions, behaviors, wants and/or needs of the user for a given set of inputs or input data. In this illustration, the data domain includes session data collected for interactions of the user with baseline input data. In another example, the training dataset is from different data domains to include input data other than baseline.

As such, the neural network 190 may predict or determine, in part, predicted or expected responses, actions, behaviors, wants and/or needs of the user for a given set of inputs. Based on these predictive results, the neural network 190 may also define an AI model 120 that is used to provide contextually aware (e.g., of the environment and user) services for the corresponding user.

Figure 2:
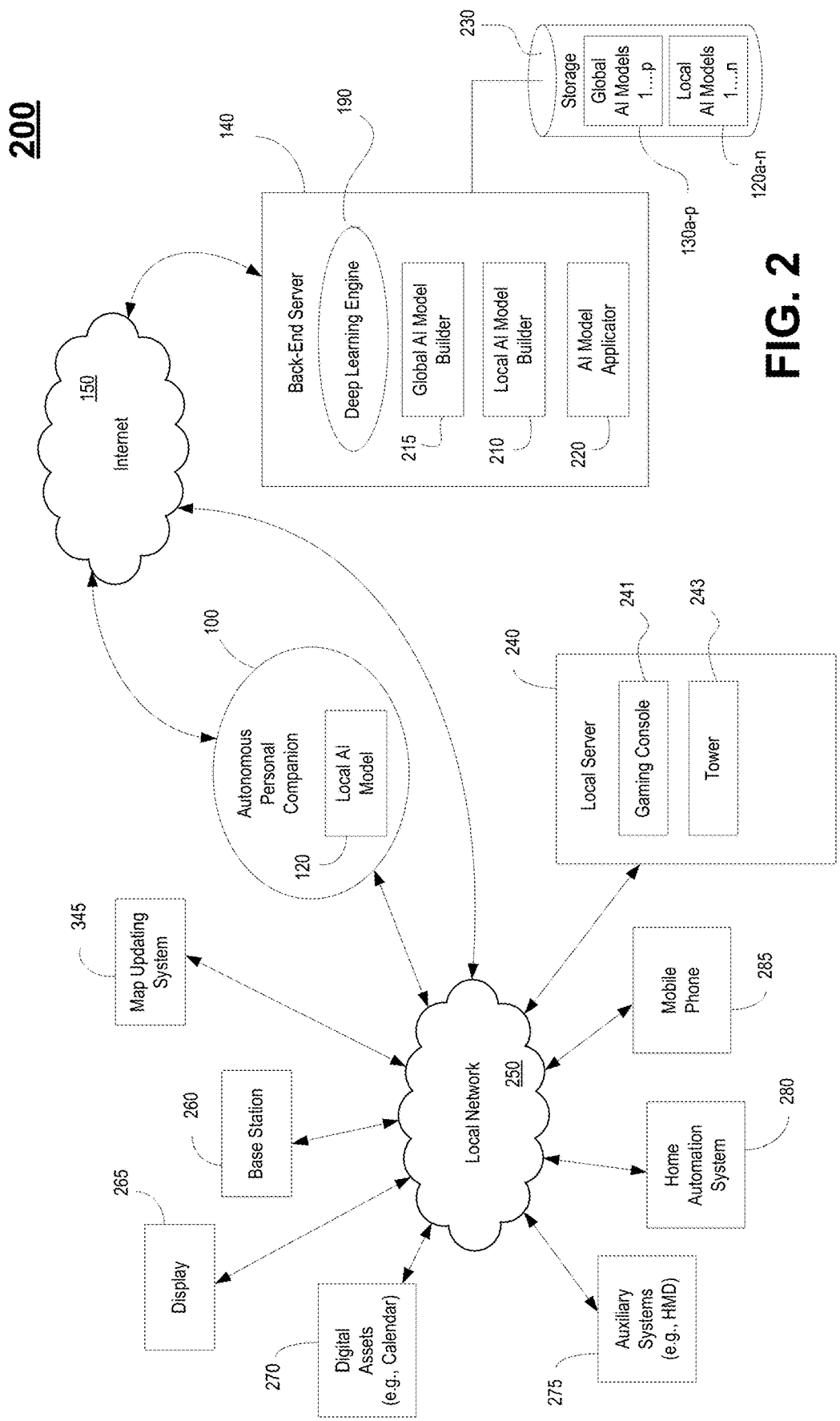
FIG. 2 illustrates a system supporting an autonomous personal companion implemented through an AI model of a user, in accordance with one embodiment of the present disclosure.

FIG. 2 illustrates a system 200 supporting an autonomous personal companion 100 implemented through a local AI model 120 of a corresponding user, in accordance with one embodiment of the present disclosure. The personal companion 100 is configured to provide services to the user based on the local AI model 120 which is capable of predicting among others the responses, actions, behaviors, wants and/or needs of the user.

As previously described, the personal companion 100 may work independently of or in conjunction with a back-end server 140 that performs modeling of the local AI model 120, and application of the local AI model. In particular, the back-end server 140 includes the deep learning engine 190, previously described, that is configured for learning and/or modeling, in part, the responses, actions, behaviors, wants and/or needs of the user for any given set of inputs (e.g., that define a given scenario driven by or experienced by the user) in order to build and apply a local AI model 120 that supports and provide services to the corresponding user. In particular, the local AI model builder 210 is configured to interface with the deep learning engine to build the one or more local AI models 120a-n that are stored in storage 230. In addition, the global AI model builder 215 is configured to interface with the deep learning engine to build the one or more global AI models 130a-p, previously described, and also stored in storage 230. For example, the AI model builders 210 and 215 may operate to set the parameters defined within the deep learning engine 190 that define the various nodes in the input layer 191, hidden layers 192, and output layer 193, for purposes applying the corresponding AI models within the deep learning engine 190.

The autonomous personal companion 100 may implement the local AI model 120 both within its form factor (e.g., autonomous robot shell) and through the back-end server 140, or a combination thereof. As previously described, companion 100 may implement the local AI model 120 independent of the back-end server, such as when performing less complex AI operations (e.g., a request to turn on the room lights), or when there is limited or no network connectivity. In addition, the companion 100 may implement the local AI model 120 in cooperation with the back-end server. For example, the companion 100 may perform preliminary operations through the local AI model 120 that is localized in order to structure or condition the input parameters (e.g., defining the operations to be performed) so that they are easily delivered (e.g., reduced and/or compressed) to the back-end server 140, wherein most of the artificial intelligence within the AI model 120 is performed by the AI model applicator 220 and/or the deep learning engine 190.

As shown in FIG. 2, the autonomous personal companion 100 is located within the same environment of the user, so that it may provide services to the user. The companion 100 is able to interface with one or more digital or physical objects and/or entities either directly through wired or wireless connections (not shown) or through the local network 250, wherein the network 250 may include wired or wireless connections. FIG. 2 shows the interfacing of companion 100 with various digital and/or physical objects. Additional interfacing with other digital and/or physical objects are contemplated. As shown, companion 100 may interface with the objects in the local environment directly (e.g., wired or wireless peer-to-peer communication) or through a local network 250 (e.g., Bluetooth, Wi-Fi, local area network, etc.) via wired or wireless connections. In addition, local network 250 is communicatively coupled with the wide area network or internet 150 to facilitate communication of the various digital and physical objects communicating through local network 250 to other remote objects (e.g., back-end server 140, other servers, etc.)

For example, the companion 100 may interface with base station 260, such as moving one or both of the base station 260 and the companion 100 to the same or approximately the same location for purposes of recharging the companion 100, or communicating with the base station to receive software updates, as well as other exemplary use cases.

In addition, the companion 100 may interface with a local server 240, wherein the server 240 may include a gaming console 241, tower computer 243, etc. For example, the gaming console 241 may provide a main stream of data to display 265, and may also provide summaries or the complete version of the main stream to the companion 100, so that companion 100 may access helpful information (e.g., gaming assistance) that can be displayed (e.g., through a display of companion 100) or delivered (e.g., audio) to the user simultaneous with the game play of the user. The tower 243 may provide additional features that the companion 100 may control or take advantage of, such as search operations, file storage, etc.

In one embodiment, companion 100 may interface and/or implement a map updating system 345, which may be located within or remote from companion 100. The map updating system 345 is configured to continually map the environment within which the companion 100 is located. For example, the updating may occur as a background process to other applications executing on companion 100. In that manner, as objects move around the environment or are newly introduced into the environment, the map updating system 345 is able to recognize that movement and/or introduction to continually update the mapping of objects and structures within the environment. As such, based in part on the updated mapping, the companion 100 is able to move about the environment without colliding with objects. Movement by companion 100 may be necessary to place the companion in the best position to provide services. For example, companion 100 may need to move closer to a wall that is used to project images, or may need to move closer to the user to better listen to the user for purposes of holding a conversation or responding to requests, etc.

As a further example, companion 100 may interface with one or more digital assets 270, for purposes of controlling operations within those assets or accessing data within those digital assets. For example, a digital asset may include a calendaring feature that is implemented within a processor or operating system, such as through local server 240, in which case, the companion 100 may be tasked to update or create an entry, or obtain imminent calendar dates, etc. on the calendaring feature.

In still another example, the companion 100 may interface with one or more auxiliary systems 275. For example, an auxiliary system 275 may include a head mounted display (HMD), such that the personal companion may receive updates from the virtual reality (VR) content being displayed through the HMD in order to provide additional content to be displayed within the HMD that is consistent with the VR content (e.g., providing information augmenting the VR—implementing augmented reality).

Also, the companion 100 can interface with a home automation system 280 that is configured to automate the functioning of the home (e.g., setting thermostats for heating and cooling, ventilation controls, window coverings, network connectivity, digital content delivery and presentation, home appliances including washers and dryers, etc.). As such, companion 100 may instruct the home automation system 280 to turn off lights in the entertainment room in order to provide the best lighting for a display concurrent with the game play of the user.

In addition, companion 100 may interface with mobile phone 285 to access and/or control various features provided by phone 285. For example, companion 100 may connect with the streaming music feature on phone 285 to broadcast music.

Figure 3A:
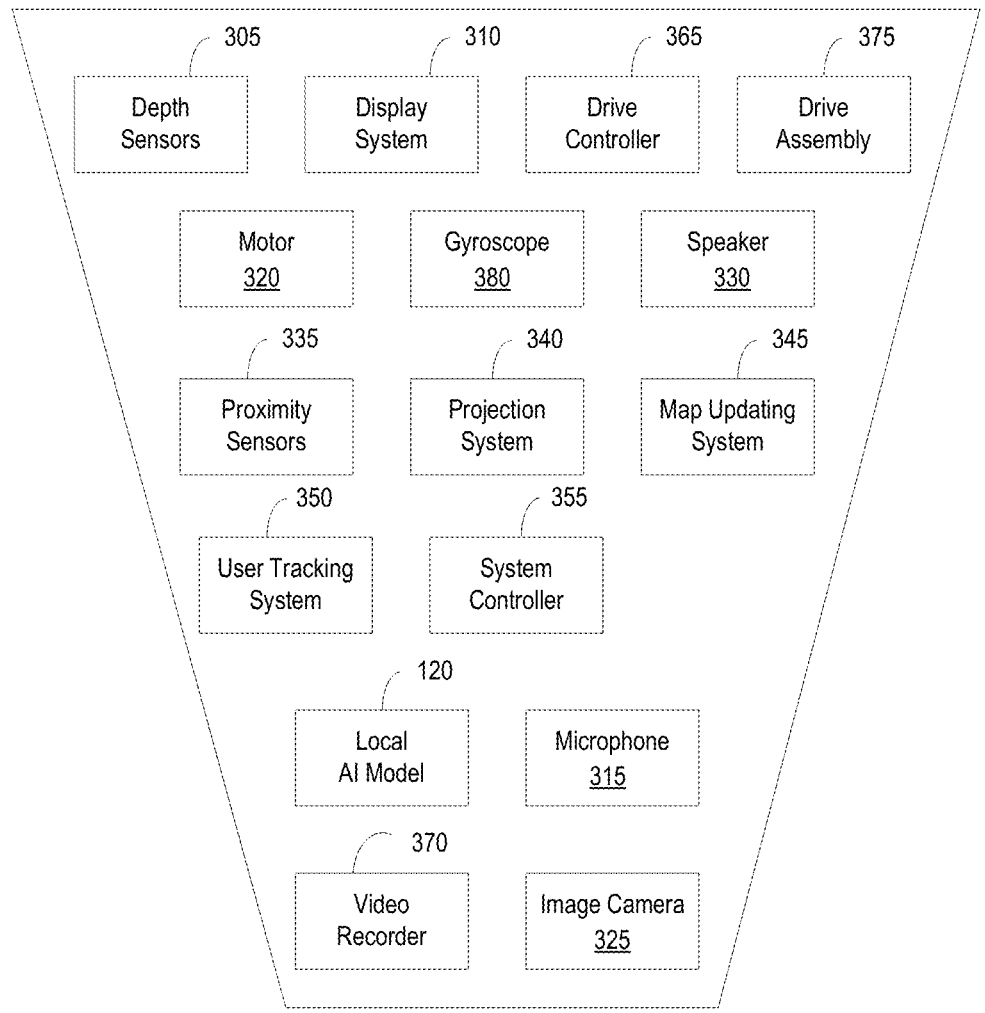
FIG. 3A is a block diagram of an autonomous personal companion that is implemented through an AI model of a user, in accordance with one embodiment of the present disclosure.

FIG. 3A is a block diagram of an autonomous personal companion 100 that is implemented through a local AI model of a user, in accordance with one embodiment of the present disclosure. As previously introduced, the companion 100 is configured to interface with a corresponding user to provide services of any type (e.g., digital, physical, etc.) through a local AI model 120. The local AI model 120 may be a distributed model that cooperates with a back-end server 140 to predict, in part, the behaviors, responses, actions, reactions, wants and/or needs of the user. Though various exemplary components of the companion 100 are shown in FIG. 3A, other functions and/or components are well supported.

As shown in FIG. 3A, companion 100 includes a system controller 355 configured to manage the overall operations. For example, controller 355 may manage the hardware and software resources available for use by the various components in order to facilitate operation of the companion 100. In addition, controller 355 may control one or more of the components (e.g., motor 320, depth sensor 305, etc.) provided within companion 100, including the interfacing and cooperation between the components.

Drive controller 365 is configured to manage the mobility functions implemented by the companion 100. The ability for motion is provided, in part by the motor assembly 320 (e.g., electric, fuel, etc.), or other means for propulsion, and the drive assembly 375 configured to impart motion to the companion 100. In some implementations, drive assembly 375 may include one or more wheels, or other means (e.g., hover capability) configured to provide movement of companion 100. In some cases, gyroscope 380 may provide stability information to the drive controller 365 in order to keep the companion 100 in the correct orientation, while in a stationary position, or while moving.

Companion 100 may include components configured for aiding navigation of the companion through a current environment. For example, depth sensors 305 and proximity sensors 335 may provide information regarding fixed and moving objects in the environment. In particular, proximity sensors 335 may be configured to determine the location of objects (e.g., by detecting surfaces) in close proximity to companion 100. Depth sensors 305 may also be configured to determine the locations of near and far objects within the environment of companion 100. That is, the sensors 305 and 335 are able to determine the depth of objects in relation to a placement of the companion 100 within the environment, and through continual updating generate a mapping of the environment that includes locations of objects (new and updated) within the environment. In addition, depth sensors 305 may be configured to determine the composition of the objects, such as determining whether an object is hard (e.g., metal desk) or soft (e.g., couch). Depth and proximity sensors may employ one of various techniques for determining the location and/or composition of objects within the environment, including the use of electromagnetic fields, induction, radio frequencies, thermal variations, infrared frequencies, air flow, etc. Further, images may be captured by camera 325 and/or video recorder 370 in order to provide object information (e.g., relational positioning of objects), as well as providing other uses and services (e.g., personal image and video capture, video gaming recording, recording of daily activities of user, etc.).

In addition, map updating system 345 may use, in part, the information provided by the depth sensors 305 and proximity sensors 335 in order to map the environment. Other information and/or data may be accessed for purposes of mapping to include architectural blueprints, images captured by camera 325, video recorder 370, and the microphone 315, etc. Mapping system 345 may be configured to provide a three dimensional (3D) view of the environment. For example, the data collected by the various components and/or third party information can be used to generate one or more types of mapping of the environment. These mapping include two-dimensional and 3D maps. Further, map updating system 345 continually maps the environment using one or more tools (e.g., depth sensors 305 and proximity sensor 335, etc.), as previously described. For example, objects that move around or are introduced into the environment are discoverable, such that locations of the objects are updated into the mapping of the environment. Other types of mappings include images and video tours of the environment. In one embodiment, the information may be used to map out the home of the user, wherein room locations can be determined, walls of the rooms can be classified (e.g., for purposes of determining which can be used as projection screens), actual and virtual images of the various rooms may be stored and provided, and video and virtual tours of the home may be generated (e.g., for purposes of insurance, real estate showings, etc.).

In another embodiment, companion 100 may include a display system 310 for purposes of entertainment, communication, etc. For example, display system 310 may be used for communicating with the user, such as when providing results of an internet search by the user, or querying the user for one or more purposes (e.g., inquiring about the general well-being of user, clarifying various requests by the user, etc.). In addition, display system 310 may be used as a primary gaming display (showing the game play of the user playing a gaming application as streamed by a primary gaming stream from a gaming console), or auxiliary display for providing secondary gaming stream (e.g., information related to the game play of the user). Display system 310 may be configured to show a movie, or other digital content. Display system 310 may work in conjunction with speaker or audio system 330 for providing audio in relation to the images or video provided by the display. For example, audio of the game play of the user may be presented in association with and synchronized with the video of the game play as presented on display.

Further, companion 100 may include a projection system 340 for purposes of entertainment, communication, etc. Projection system may provide similar functionality as display system 310 to include providing communication with the user, or displaying a primary stream from a gaming application as provided by a console or back-end streaming service, providing secondary stream of data (e.g., as an auxiliary screen to a gaming application providing secondary or supplementary information, or providing an expanded view of the gaming world in conjunction with a primary display), displaying digital content, etc. In addition, other features may be provided through the projection system 340. Because the projected images can be larger vs. a display system, expanded viewing options may be provided. For example, different types of videos and/or imaging (e.g., holographic, 3D, etc.) may be presented through the projection system 340 of companion 100.

Video recorder 370 and the microphone 315 (e.g., audio recorder) in combination are configured to capture video and/or audio of digital information collected and/or generated by companion 100. For example, the game play (e.g., video and audio) of the user playing a gaming application may be collected and stored. Additional information may be collected by video recorder and microphone, such as additional audio from the user as the user is playing the gaming application, and joined with the video and audio of the game play.

In addition, a user tracking system 350 may be configured to track general and specific movement of the user. General movement includes overall body movement of the user within the environment. Specific movement may be targeted to a part of the body, such as determining the movement of the head, or torso of the user. For example, tracking system may determine orientation of the various body parts of the user, and track the turning of the head or body. Tracking system 350 may collect data provided by one or more other components, including images and video from camera 325 or video recorder 370, depth sensors 305, proximity sensors 335, or other tracking sensors (e.g., integrated or third party sensors—such as provided through a gaming console), etc.

Figure 3B:
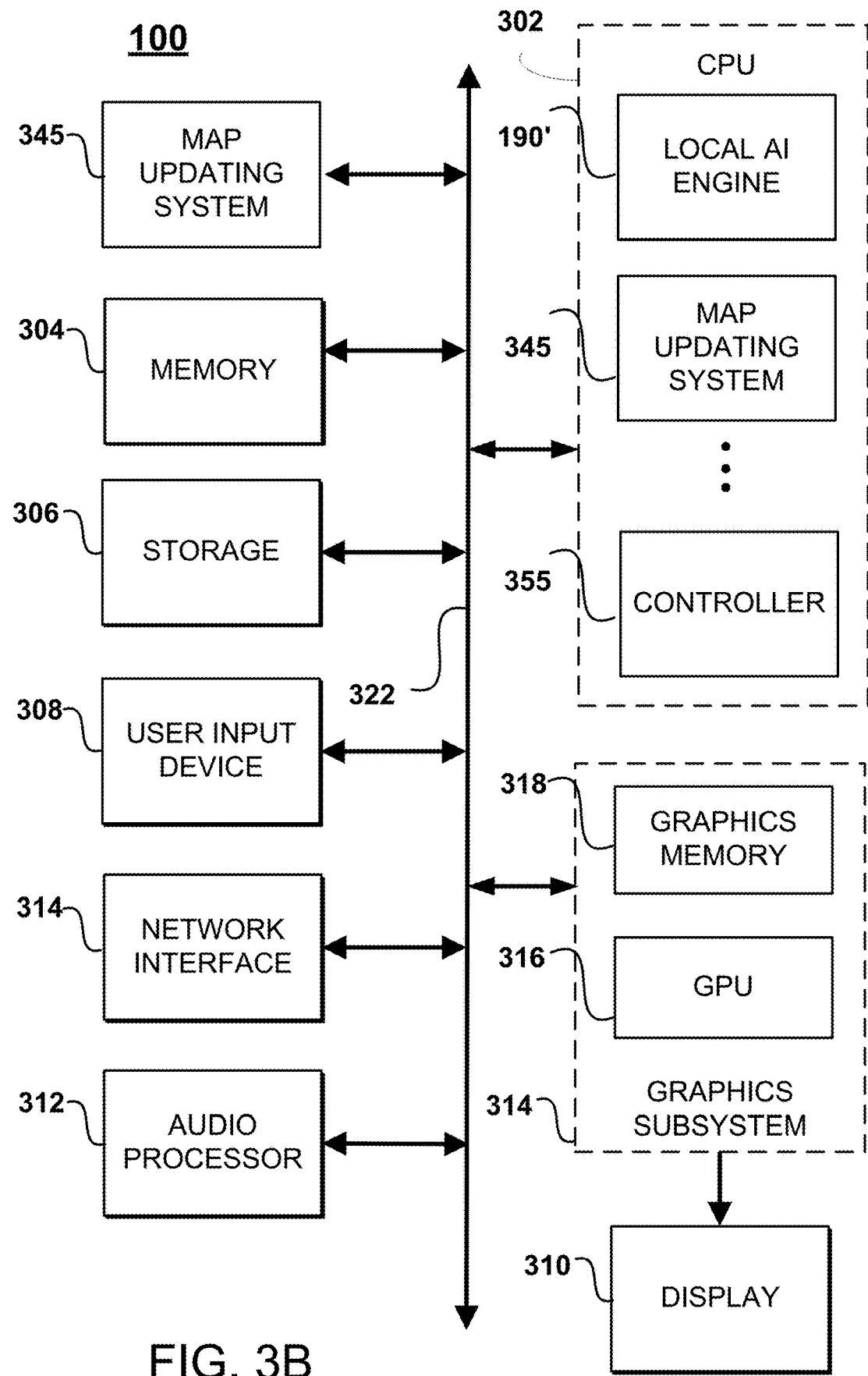
FIG. 3B illustrates components of an example device 100 that can be used to perform aspects of the various embodiments of the present disclosure.

FIG. 3B illustrates components of an example device 100 that can be used to perform aspects of the various embodiments of the present disclosure. For example, FIG. 3B illustrates an exemplary hardware system suitable for implementing a device that provides services in support of a user, wherein the device is configured to provide services as implemented through a local AI model that is capable of predicting, in part, the behaviors, actions, reactions, responses, wants and/or needs of a corresponding user, in accordance with one embodiment. This block diagram illustrates a device 100 that can incorporate or can be a personal computer, video game console, personal digital assistant, or other digital device, suitable for practicing an embodiment of the invention. Device 100 includes a central processing unit (CPU) 302 for running software applications and optionally an operating system. CPU 302 may be comprised of one or more homogeneous or heterogeneous processing cores.

In accordance with various embodiments, CPU 302 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for deep learning, content classification, and user classifications. For example, CPU 302 may be configured to include the localized AI engine (e.g., deep learning) 110 that is configured to support and/or perform learning operations with regards to predicting, in part, user behavior, actions, responses, reactions, wants and/or needs of the user. Also, AI engine 110 is configured to apply the local AI model 120 of the user at the companion 100. In addition, CPU 302 may provide additional functionality as provided by one or more of components of companion 100 as shown in FIG. 3A, such as the system controller 355, drive controller 365, map updating system 345, etc.

As shown, the map updating system 345 may be implemented through a hardware based device located within the companion 100. In particular, the map updating system 345 is configured to generate a mapping of the environment within which the companion 100 is located. This mapping may include a localized positioning system, such as a newly generated and/or formatted coordinate system defining the positions within space of the environment. For example, the coordinate system may incorporate values of a global positioning system (GPS), or a 3D Cartesian coordinate system, a mix of systems (e.g., floor plan defining rooms of a building interfaced with individual coordinate systems for each room), or any suitable positioning system.

Memory 304 stores applications and data for use by the CPU 302. Storage 306 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 308 communicate user inputs from one or more users to device 100, examples of which may include keyboards, mice, joysticks, touch pads, touch screens, still or video recorders/cameras, and/or microphones. Network interface 314 allows device 100 to communicate with other computer systems via an electronic communications network, and may include wired or wireless communication over local area networks and wide area networks such as the internet. An audio processor 312 is adapted to generate analog or digital audio output from instructions and/or data provided by the CPU 302, memory 304, and/or storage 306. The components of device 100, including CPU 302, memory 304, data storage 306, user input devices 308, network interface 310, and audio processor 312 are connected via one or more data buses 322

A graphics subsystem 314 is further connected with data bus 322 and the components of the device 100. The graphics subsystem 314 includes a graphics processing unit (GPU) 316 and graphics memory 318. Graphics memory 318 includes a display memory (e.g., a frame buffer) used for storing pixel data for each pixel of an output image. Graphics memory 318 can be integrated in the same device as GPU 316, connected as a separate device with GPU 316, and/or implemented within memory 304. Pixel data can be provided to graphics memory 318 directly from the CPU 302. Alternatively, CPU 302 provides the GPU 316 with data and/or instructions defining the desired output images, from which the GPU 316 generates the pixel data of one or more output images. The data and/or instructions defining the desired output images can be stored in memory 304 and/or graphics memory 318. In an embodiment, the GPU 316 includes 3D rendering capabilities for generating pixel data for output images from instructions and data defining the geometry, lighting, shading, texturing, motion, and/or camera parameters for a scene. The GPU 316 can further include one or more programmable execution units capable of executing shader programs. In one embodiment, GPU 316 may be implemented within AI engine 190' to provide additional processing power, such as for the AI or deep learning functionality.

The graphics subsystem 314 periodically outputs pixel data for an image from graphics memory 318 to be displayed on display device 310, or to be projected by projection system 340. Display device 310 can be any device capable of displaying visual information in response to a signal from the device 100, including CRT, LCD, plasma, and OLED displays. Device 100 can provide the display device 310 with an analog or digital signal, for example.

It should be understood that the embodiments described herein may be executed on any type of client device. In some embodiments, the client device is a head mounted display (HMD), or projection system.

Figure 4B:
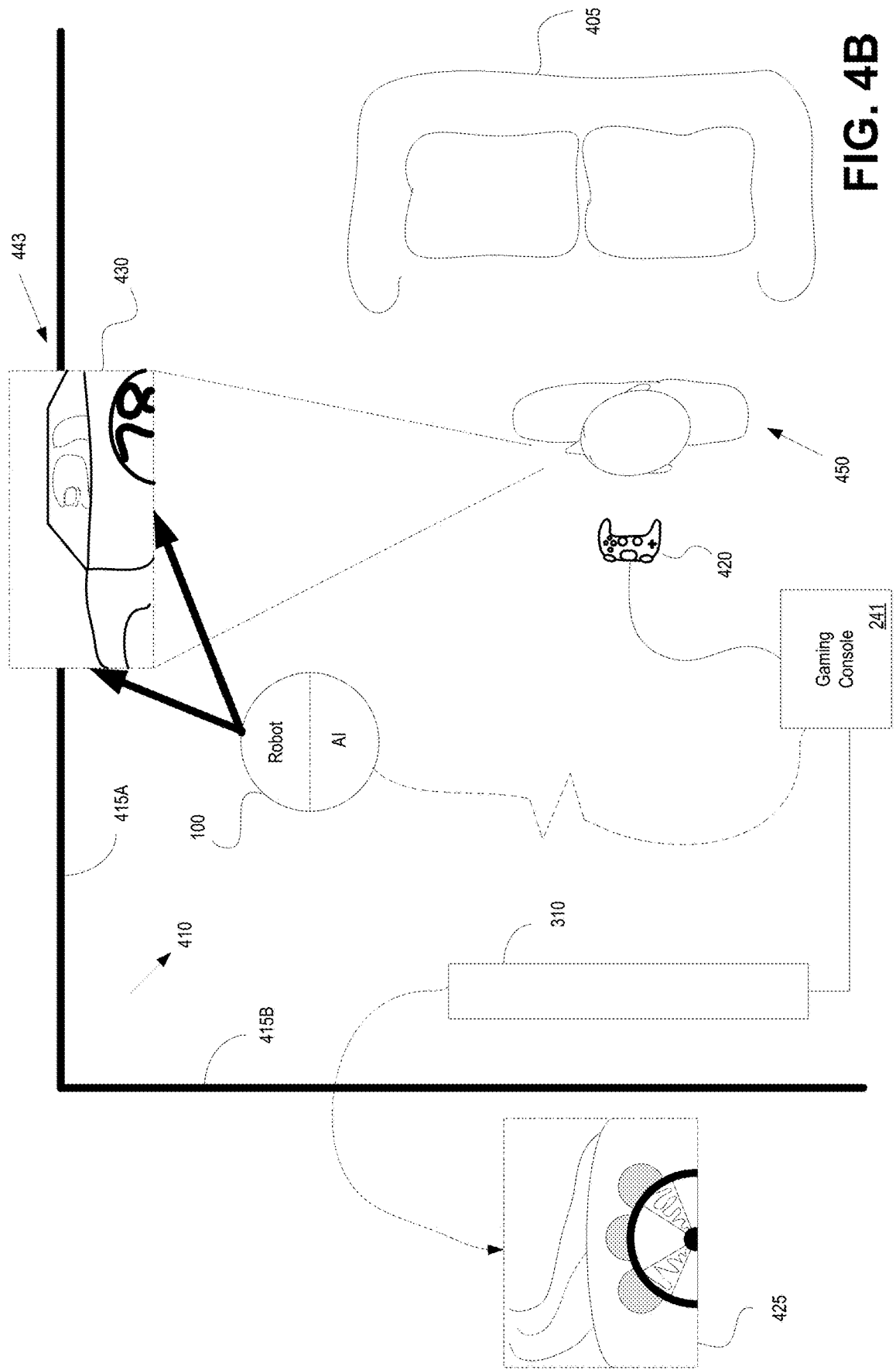
FIG. 4B illustrates the integration of a three-dimensional (3D) gaming world of the gaming application, played by the user introduced in FIG. 4A, and the physical environment of the user, wherein the autonomous personal companion is configured to project a portion of the 3D gaming world into the physical environment in response to a direction of the gaze of the user, in accordance with one embodiment of the present disclosure.
Figure 4C:
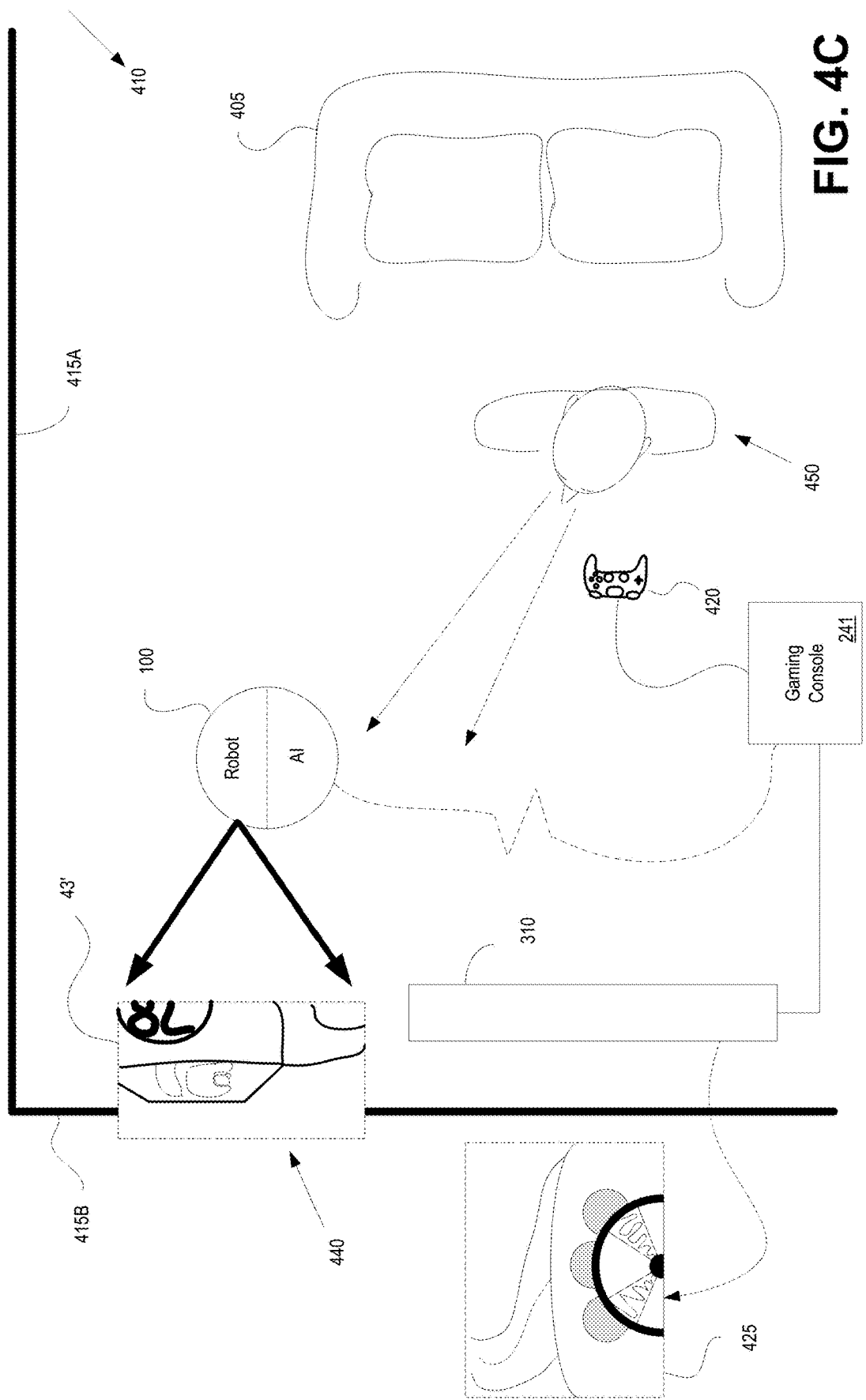
FIG. 4C illustrates another example of the integration of the 3D gaming world of the gaming application introduced in FIGS. 4A-4B, wherein an extension of the 3D gaming world of the gaming application is projected alongside a display, wherein the display shows the main view of the gaming application, wherein the extension shows a portion of the 3D gaming world, or provides supplemental information to the gaming application, in accordance with one embodiment of the present disclosure.

FIGS. 4A-4C illustrate one exemplary implementation of an autonomous personal companion 100 within a home environment of a corresponding user, in accordance with one embodiment of the present disclosure. As previously described, companion 100 is configured to provide services to the user through a local AI model 120, wherein the AI model 120 may work independent of any back-end server, or may work in a distributed fashion with an AI model 120 located at a back-end server to predict, in part, the behaviors, responses, actions, reactions, wants and/or needs of the user. Though companion 100 is configured to provide a variety of services under various scenarios, FIGS. 4A-4C show a scenario where a user 450 is playing a gaming application that is executing on a gaming console 241 (or executed at a back-end server and streamed through the gaming console), and where companion 100 is capable of providing supplementary information to the game play of the user 450.

As shown, the user is located in a home environment 410, such as an entertainment room. The room includes two walls 415A and 415B. The environment 410 includes a couch 405. The user has access to a gaming console 241. In particular, the gaming application is executing and/or streaming through gaming console 241 (or any other device) in association with game play of the user 450, wherein the game play is responsive to user input, such as through controller 420. A primary stream of the game play is created, wherein video of the game play is delivered to display 310. In addition, audio of the game play may be provided through an audio system (not shown). The gaming application may be an open road racing game, wherein the user is playing a driver of a car in the race. Screen shot 425 shows an image of the video stream delivered to the display 310, and includes a view out of the front windshield and over the dash of the race car that shows the oncoming road, as well as the steering wheel and various instruments in the dash.

In addition, companion 100 is located in the environment 410, and includes a robot form factor 105 and AI 110 that is configured to implement a local AI model 120 of user 450. For example, AI 110 may be AI engine 190' that cooperates with AI engine 190 at back-end server 140. The local AI model 120 as implemented through AI 110 is configured to provide, in part, services to user 450 related to the game play. As such, companion 100 may be communicatively coupled to gaming console 241 at least to receive information about the gaming application and/or game play. For example, the information may include the title and version of the game, the game state of the game play. In addition, companion 100 may include information provided in a secondary stream of the gaming application. For instance, gaming console 241 may generate a primary stream for presentation on display 310 and a secondary stream that is presented (e.g., via display, projection, speaker, etc.) through companion 100.

In one embodiment, companion 100 is configured to provide supplemental information supporting the game play of a user, wherein the information may be related to game plays of the user and other players playing the gaming application. The information may provide general information related to the gaming application, in some implementations. The supplemental information may provide assistance to the user 450 in advancing the game play. For example, the assistance may be in the form of coaching to help the user 420 achieve a goal (e.g., pass a level), and may include visual cues showing controller inputs that generally or directly help the user achieve the goal within the gaming application. A detailed description of the supplemental information as provided through a companion application is provided in co-pending patent application entitled "GAME PLAY COMPANION APPLICATION," U.S. patent application Ser. No. 15/476,597, filed on Mar. 31, 2017, herein incorporated by reference in its entirety.

FIG. 4B illustrates the autonomous personal companion 100 interfacing with the gaming console 241 to provide supplemental information related to the game play of user 450, as introduced in FIG. 4A. For instance, FIG. 4B shows user 450 within environment 410 playing a gaming application executed on or streamed through gaming console 241. In particular, FIG. 4B illustrates the integration of a three-dimensional (3D) gaming world of the gaming application, and the physical environment of the user. As shown, companion 100 is configured to project a portion of the 3D gaming world of the gaming application into the physical environment 410. For instance, companion 100 is able to extend the view of the 3D world beyond what is presented on display 310, which continues to show screen shot 425. In particular, companion 100 projects a video stream (including screen shot 430) as a secondary stream of the gaming application, simultaneous with the primary video stream presented on display 310 (and including screen shot 425).

In addition, the projection provided by companion 100 may be made in response to a direction of the gaze of the user 450, in accordance with one embodiment of the present disclosure. For instance, a gaze tracking system of companion 100 or working in conjunction with companion 100 is configured to capture the direction of the gaze of user 450 during the game play. As an illustration, as the user is racing, a sound may be directionally provided within environment 410, which may trigger head movement. As shown, the head of user 450 is turned dramatically to the right. Other triggers are supported, such as an arrow pointing to the right side, as displayed within the primary stream on display 310. For example, a sound locator and projection system in companion 100 may produce a sound that originates, or is made to originate from a location in environment 410 that also corresponds to a point of origin within the gaming world of the gaming application. The sound may be from the engine of a competitor that is trying to pass the driver controlled by user 450, and may originate to the right of the driver, or more specifically from the right side of the cockpit. As the head of the user turns to the right to gain a better view of the passing racer, a projection of that portion of the gaming world as viewed from the standpoint of the user 450 is presented on wall 415A in area 443, wherein the projection is presented in approximately the proper location of the objects in the gaming world and in relation to a location of the character played by the user, wherein the character location is associated with a physical location of the user 450. As shown, a screen shot 430 of the projection of the secondary information includes Race Car No. 78 passing on the right side.

In one embodiment, area 443 may have been discovered during a mapping process of environment 410 previously accomplished. The mapping process discovered that area 443 may be suitable for displaying supplemental information and/or content. Companion 100 may position itself with respect to wall 415A and/or user 450 in environment 410 to properly present the supplemental information.

FIG. 4C illustrates another example of the integration of the 3D gaming world of the gaming application introduced in FIGS. 4A-4B, wherein an extension of the 3D gaming world of the gaming application is projected alongside display 310 showing the primary stream of the game play of user 450, in accordance with one embodiment of the present disclosure. As shown, instead of projecting the secondary or supplemental information on wall 415A, the information is projected on wall 415B, just to the right of display 310. For example, during the mapping process of environment 410, it may be determined that wall 415A cannot support projection of images. That is, even if companion 100 projected onto wall 415A, the video stream would not be viewable (e.g., wall 415A contains a bookcase). As such, companion 100 may project the supplemental information on wall 415B in an area 440 that still somewhat conveys the proper sense of location of the objects in the projection in the gaming world, especially in relation to the display 310 showing the primary video of the gaming application. In another implementation, the projection is an extension of the video stream presented on display 310. As such, companion 100 projects the supplemental video stream onto area 440, to include the screen shot 430, previously introduced in FIG. 4B, that includes the Race Car No. 78 in a passing position. Screen shot 430 is projected to the right side of the cockpit, as represented by the point-of-view (e.g., screen shot 425) of the character driver presented on display 310.

In one embodiment, the projection onto wall 415B may be triggered by the gaze of user 450 off-center from display 310. As shown, the head of user 450 is not turned approximately 90 degrees, as it would be in the gaming environment, but more like 45 degrees to view area 440 of wall 415B. In other embodiments, the projection may be autonomously produced by companion 100 during the execution of the gaming application. For example, the supplemental information may be automatically projected by companion 100 to provide an enhanced user experience. In that case, other supplemental information may be provided at other locations within environment 410 at other times.

Figure 5:
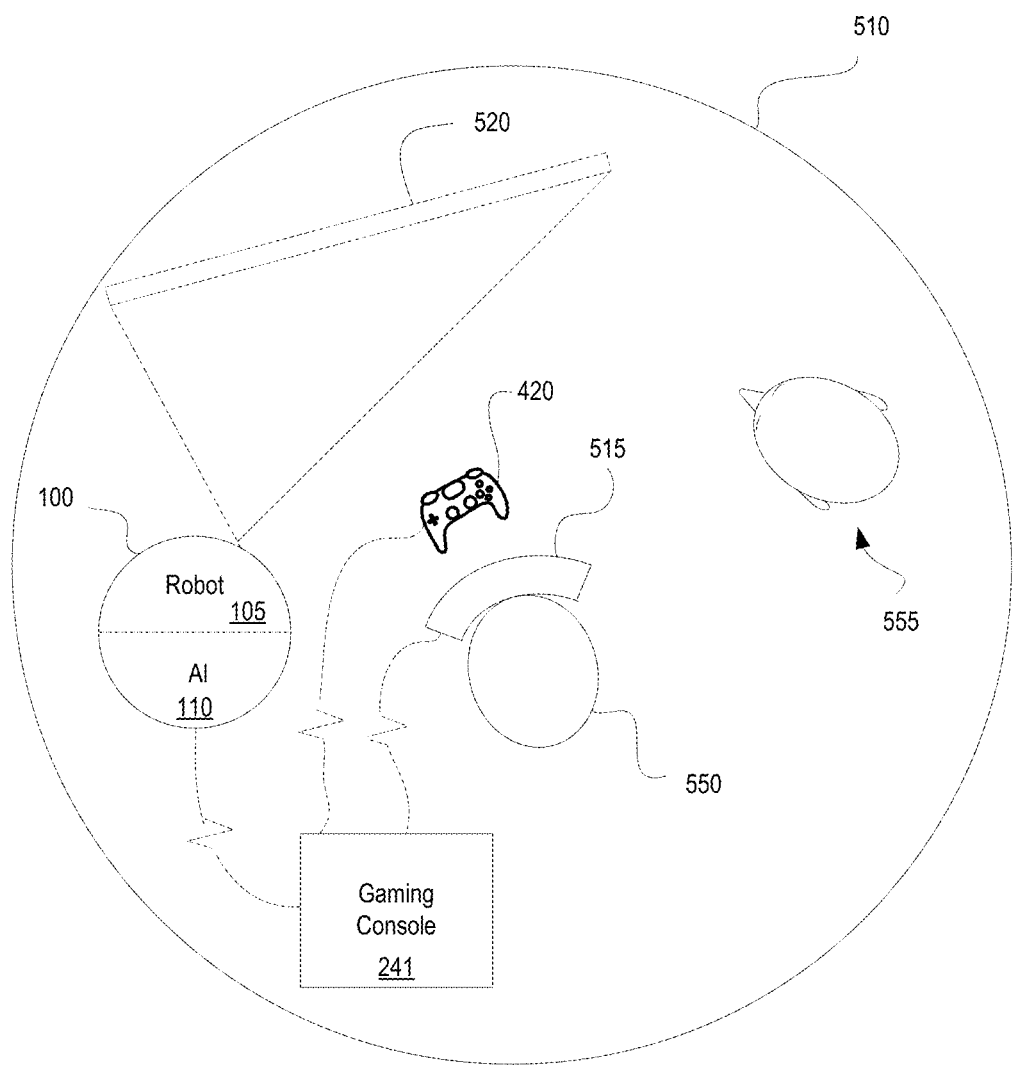
FIG. 5 illustrates the integration of a 3D virtual reality (VR) world of a gaming application played by a first user using a head mounted display (HMD) and the physical environment, wherein an autonomous personal companion is configured to project a portion of the VR gaming world into the physical environment in response to a direction of the gaze of the user to allow a spectator to have a parallel participation in the experience of VR gaming world of the first user, in accordance with one embodiment of the present disclosure.

FIG. 5 illustrates the integration of a 3D virtual reality (VR) world of a gaming application played by a user 550 using a head mounted display (HMD) 515 and the physical environment 510, in accordance with one embodiment of the present disclosure. As shown in FIG. 5, user 550 is playing a gaming application that is executing on gaming console 241 (or executed at a back-end server and streamed through the gaming console, or through any other device) in association with game play of user 550, wherein the game play is responsive to user input, such as through controller 420 and/or movement of the HMD 515.

As previously described, companion 100 is configured to provide services to the user through a local AI model 120, wherein the AI model 120 may work independent of any back-end server, or may work in a distributed fashion with an AI model 120 located at a back-end server to predict, in part, the behaviors, responses, actions, reactions, wants and/or needs of the user. Companion 100 includes a robot form factor 105, and artificial intelligence for implementing the AI model 120 corresponding to the user 550.

More particularly, companion 100 is configured to project a portion of a virtual reality (VR) gaming world of the gaming application into the physical environment 510. For example, the projection 520 of the VR gaming world may be made onto a wall (not shown) in the environment 510. The projection 520 may also be made through a physical display that is controlled by companion 100. In this manner, the view as experienced by the user 550 may also be presented to the spectator 555. In one embodiment, the projection is made in response to a direction of the gaze of the user 550 to allow spectator 555 to have a parallel participation in the experience of VR gaming world of user 550, in accordance with one embodiment of the present disclosure. As such, if the environment 510 is suitable for projection, as the user 550 changes orientation when viewing the VR gaming world, companion 100 may also change the projection 520 to a different location within environment 510 to closely correspond to the proper location in the VR gaming world. That is, if the head of user 550 turns 90 degrees counterclockwise, the projection 520 may be made on a wall that is to the left of user 550, and also to the left of spectator 555. In that manner, spectator may gain a sense of the VR gaming world as projected by companion application into the physical environment 510.

FIGS. 6A-6H illustrate various exemplary forms of autonomous personal companions, wherein the companions may be implemented through companion 100 as shown in FIGS. 1-5, in accordance with embodiments of the present disclosure. The companions shown in FIGS. 6A-6H are configured to provide services to a corresponding user through a local AI model 120, wherein the AI model 120 may work independent of any back-end server, or may work in a distributed fashion with an AI model 120 located at a back-end server to predict, in part, the behaviors, responses, actions, reactions, wants and/or needs of the user.

Figure 6A:
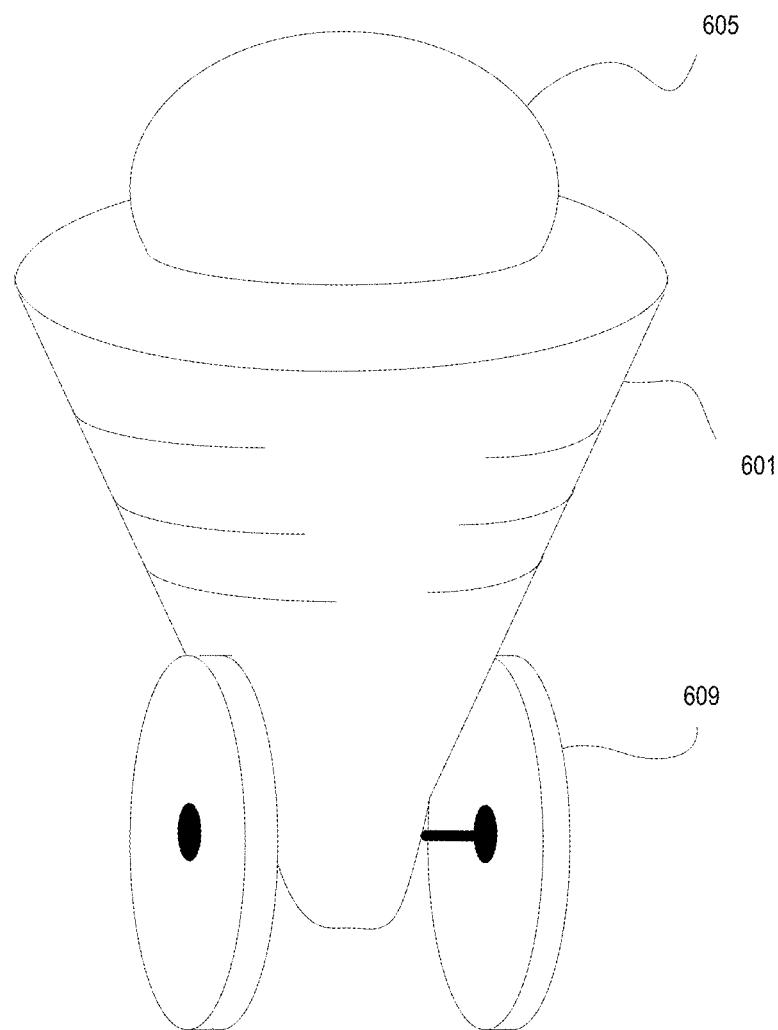
FIG. 6A illustrates an exemplary form of an autonomous personal companion for a user that is implemented through an AI model of the user, in accordance with one embodiment of the present disclosure.

In particular, FIG. 6A illustrates an exemplary form of companion 600A for a user that is implemented through an AI model of the user, in accordance with one embodiment of the present disclosure. Though FIG. 6A shows a generic form factor, companion 600A may be implemented within any suitable form factor. For example, body 601 is shown having a conical shape with the lower portion of smaller diameter than an upper portion. An upper housing 605 may protrude from body 601 to facilitate additional features of companion 600A.

In particular, companion 600A includes one or more wheels 609 in the lower portion, or any suitable means for providing mobility in two or three dimensions for companion 600A. In that manner, companion 600A may move around within environment as necessary to provide its services. For example, companion 600A may independently move around an environment to capture the best images of the environment, or to select the best location for projecting video and/or images. In addition, body 601 may rotate in one location to provide the best orientation for companion 600A within the environment.

Figure 6B:
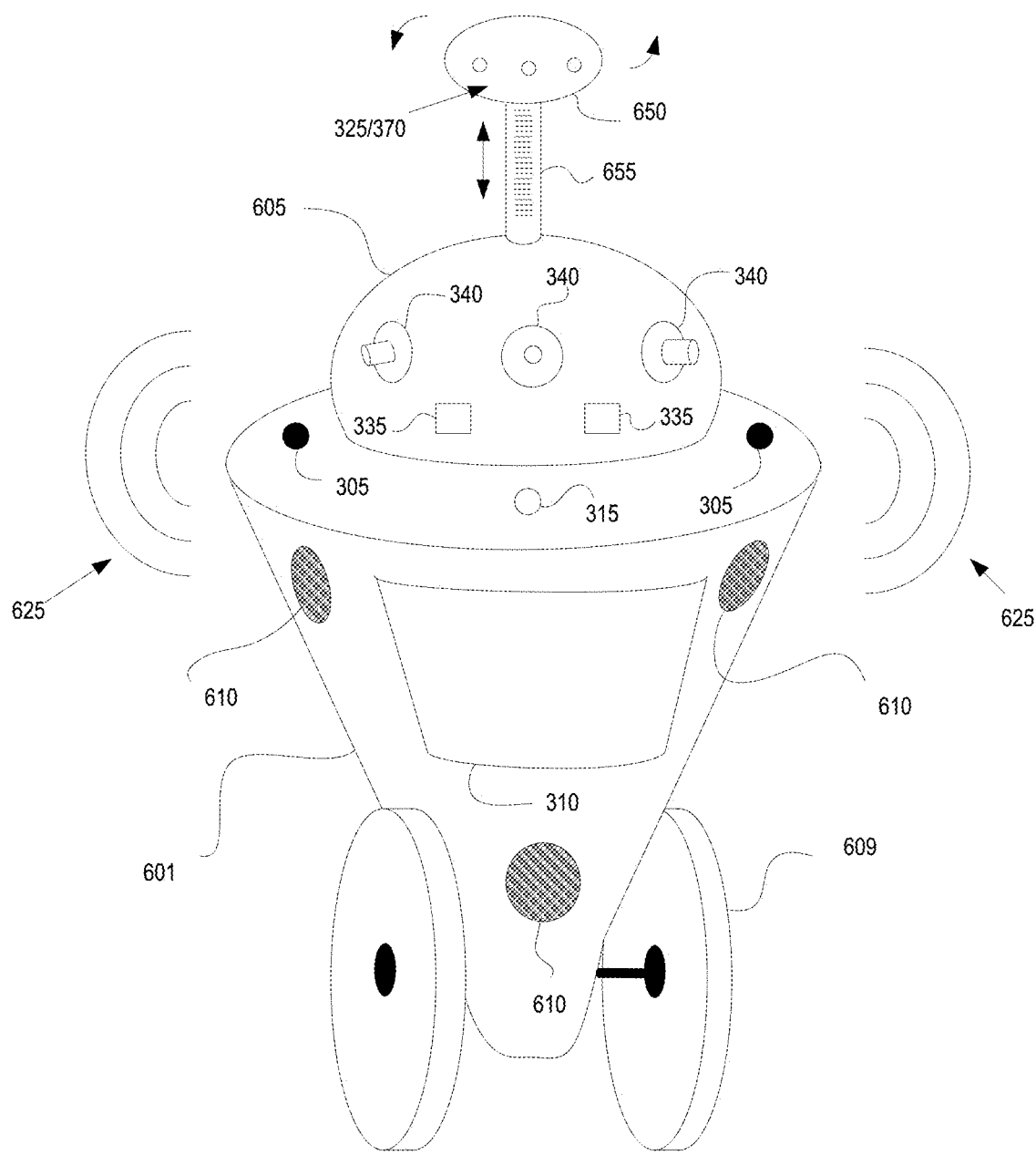
FIG. 6B illustrates an exemplary autonomous personal companion configured with an array of capabilities to include, in part, the projection of images, the sensing of the proximate environment, and the providing of auxiliary sound, in accordance with embodiments of the present disclosure.

FIG. 6B illustrates an exemplary autonomous personal companion 600B configured with an array of capabilities to include, in part, the projection of images, the sensing of the proximate environment, and the providing of auxiliary sound, in accordance with embodiments of the present disclosure. In particular, companion 600B is shown having the generic form factor with body 601, and first introduced in FIG. 6A. In addition, wheels 609 are shown to represent the ability for motion through an environment.

Companion 600B includes speakers 610 arranged throughout body 601. In addition, speakers 610 may be located in other portions of companion 600B, such as in upper housing 605. Display 310 is located on the surface of body 601, and is configured to present information and/or data when performing services for the corresponding user. For example, display 310 may display text when querying the user for a response, or present video or text in response to a query from the user. Display 310 may also present other supplementary information, such as that generated in association with the game play of a user playing a gaming application.

Companion 600B includes one or more sensors used to sense the environment, wherein the sensors may be located at various locations on the companion surface. For example, depth sensors 305 may be located on the surface of the upper portion of body 601, wherein the depth sensors are configured to determine locations of near and far objects within the environment. One or more depth sensors 305 may also be used to determine the composition of the objects, or the surface hardness of the objects. In addition, one or more proximity sensors 335 may be located in the surface of the upper housing 605, wherein the proximity sensors may be configured to determine the location of objects near to the companion 600B. As previously described, depth and proximity sensors may employ various techniques (e.g., electromagnetic fields, induction, radio frequencies, thermal variations, infrared frequencies, air flow, etc.), as shown by signals 625, to determine locations of objects.

In addition, the upper portion of body 601 includes one or more microphones 315, configured for capturing audio recordings of the environment. For example, audio of the corresponding user may be recorded to capture the live reactions of the user, which may be replayed at a later time. Also, recorded audio may be synchronized with recorded video captured by video recorder 370 located in capsule 650. Also, image camera 325 may be located in capsule 650. The combination of image camera 325 and video recorder 370 allows companion 600B to capture video and/or images of the user and/or environment.

As shown, capsule 650 has various degrees of motion and orientation. Capsule 650 is attached to lift mechanism 655, and can move up and down in relation to body 601 of companion 600B. For example, capsule 650 may raise itself to gain a better view of the environment, such as when camera 325 or recorder 370 are blocked by an object (e.g., wall, couch, furniture, book case, etc.). In addition, capsule 650 may rotate about the shaft of the lift mechanism 655, such that the rotation may occur in relation to a static body 601.

Upper housing of companion 600B may include one or more projection systems 340. As previously described, projection systems 340 may project supplementary information onto a surface of the environment (e.g., wall of a room). The surface may be determined through a mapping of the environment, as previously described. The supplementary information may be used for communicating with the user when the companion 600B is providing services to the user.

Figure 6C:
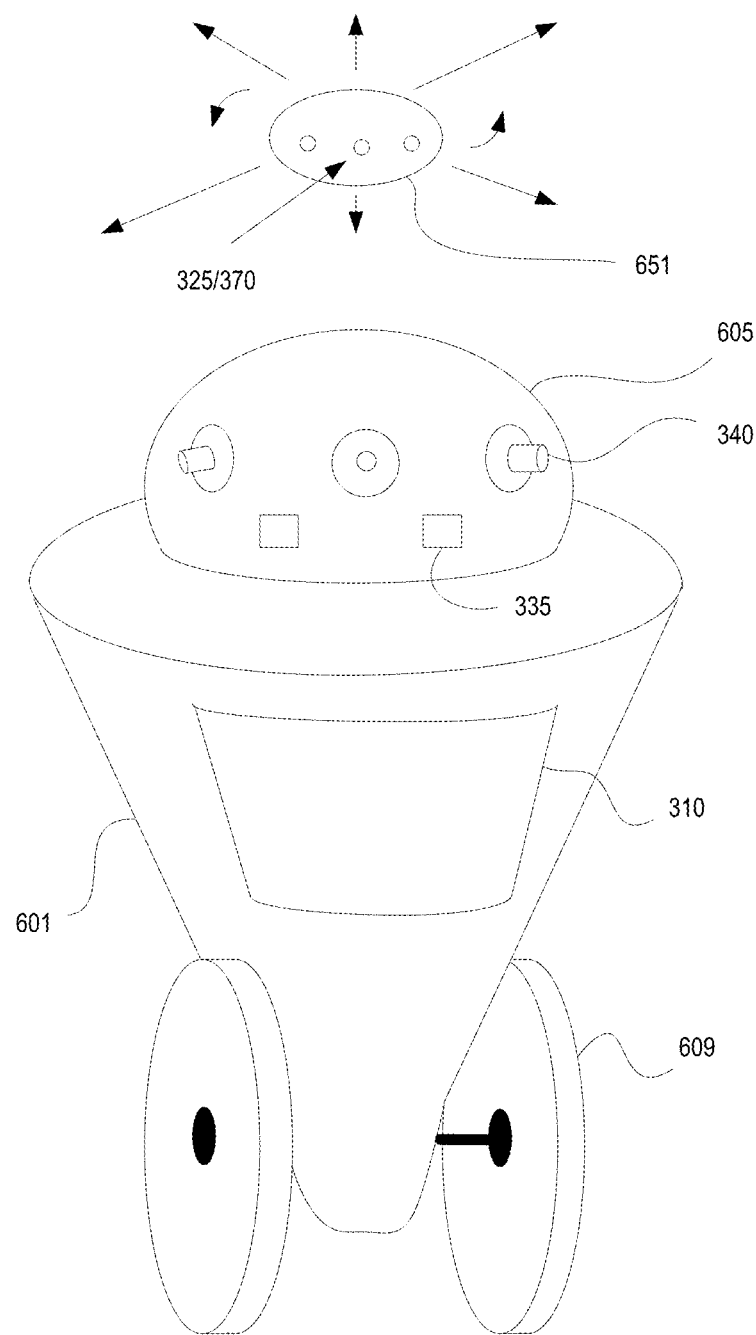
FIG. 6C illustrates an exemplary autonomous personal companion including a drone assembly that is configured with one or more features, for example image capturing and image projection, in accordance with one embodiment of the present disclosure.

FIG. 6C illustrates an exemplary autonomous personal companion 600C including a drone assembly 651 that is configured with one or more features, for example image capturing and image projection, in accordance with one embodiment of the present disclosure. As shown, companion 600C has one or more features previously introduced, to include a body 601 generically represented, means for movement (e.g., wheels 609 as shown), a display 310, proximity sensors 335, and projectors of a projection system 340. Other features previously introduced are not shown for purposes of clarity.

In particular, companion 600C includes drone assembly 651 that is coupled to upper housing 605 (or any other suitable surface area capable of receiving assembly 651) when in a resting position. For instance, drone assembly 651 may interface with upper housing 605 for purposes of charging a battery. Other resting locations are contemplated that are remote from companion 600C, such as a separate base station. Further, drone assembly 651 is communicatively coupled to one or more components of the companion 600B, such as controller 355. Image camera 325 and/or video recorder 370 may be located on drone assembly 651 for purposes of capturing images and video. Other components may also be located on assembly 651, such as a projector of the projection system 640.

As shown, drone assembly 651 is able to move about within the environment. Any suitable means for providing movement are contemplated, such as propeller systems, air flow systems, light air systems, tethering systems, etc. As such, drone assembly 651 is able to move in three dimensions throughout the environment, and rotate itself within the environment. Movement may be necessary in order to place the camera 325 and/or video recorder 370 in a better position for capturing images and/or video. For example, the view of a room in a certain direction as taken from a point corresponding to body 601 and upper housing 605 of companion 100 may be blocked by an object. The drone assembly 651 may be deployed to a location that is not obstructed by the object (e.g., straight up) in order to capture the view.

Figure 6D:
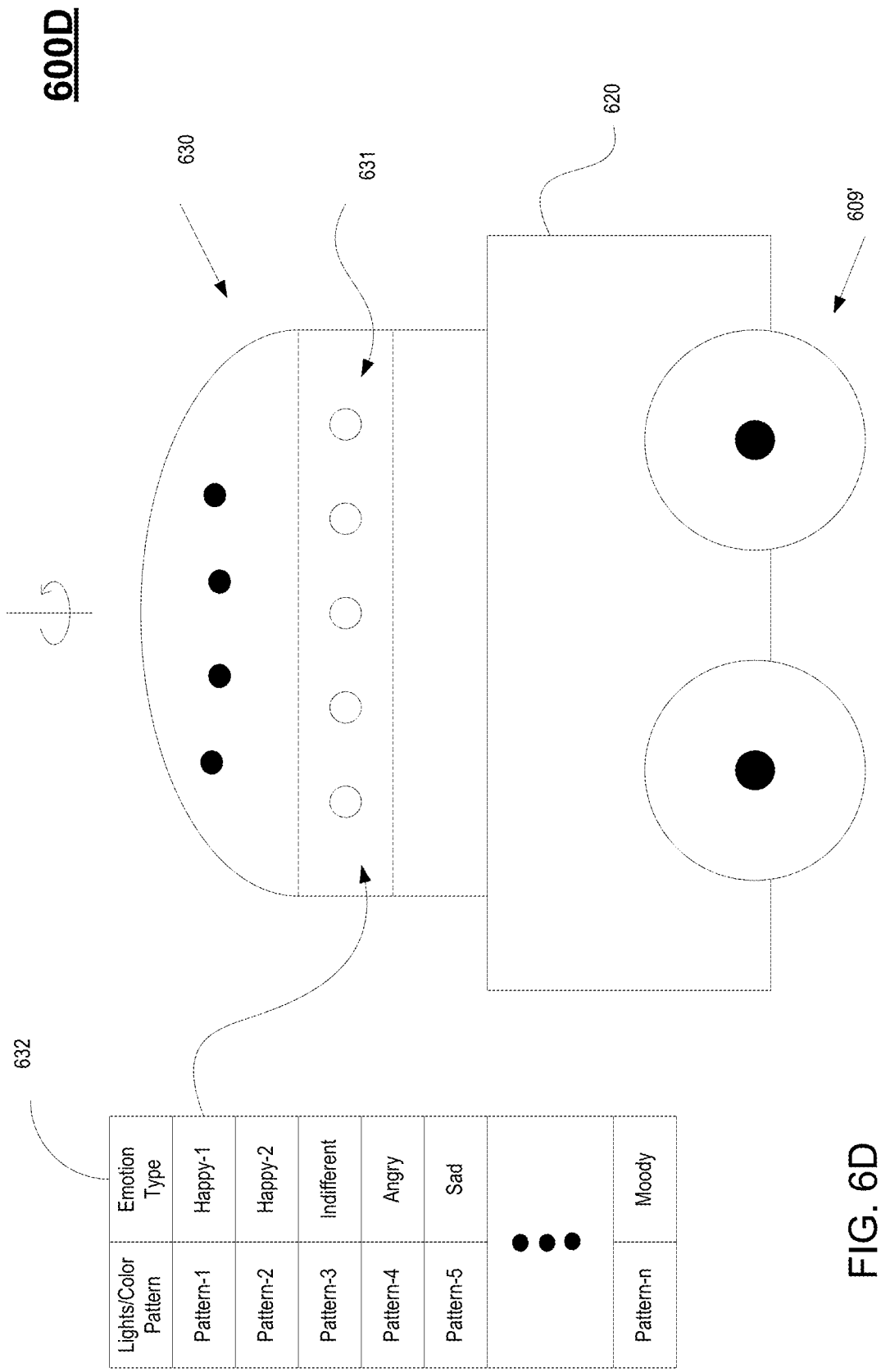
FIG. 6D illustrates an exemplary autonomous personal companion including a rotating top portion configured with one or more features, for example image capturing and image projection, in accordance with one embodiment of the present disclosure.

FIG. 6D illustrates an exemplary autonomous personal companion 600D including a rotating top portion 630 configured with one or more features, in accordance with one embodiment of the present disclosure. Companion 600D is shown to illustrate different form factors suitable for implementing the local AI model 120 of a corresponding user. As shown, companion 600D includes a base 620. Mobility means are provided within base 620, such as wheels 609', or any other suitable means for motion previously described.

In particular, companion 600D include top portion 630, which may include cameras 325, video recorders 370, depth sensors 305, proximity sensors 335, etc. For illustration, top portion 630 may be rotatable about the base 620. In that manner, companion 600D may orient itself to best provide services to a user (e.g., place itself in a good position for communicating with user). That is, combining the mobile features of companion 600D and the rotating top portion 630, a variety of orientations are possible of the companion within its environment. For example, top portion 630 may be rotated towards an object in the environment to give a camera system a good view of the object. Further, companion 600D may move closer to the object to give the camera system a better view of the object.

In some implementations, rotation of the top portion 630 is able to convey emotion or display some behavior of the companion 600D. In that case, top portion 630 may be outfitted with multi-colored lighting that are programmed to show emotion. For example, a band of lights 631 is shown on top portion 630. Each of the lights in band 631 may be turned on or off according to a corresponding pattern. In addition, each of the lights in band 631 may show a sequence of colors according to corresponding pattern. Table 632 shows a list of light patterns (e.g., on/off, color sequence, etc.), wherein each pattern may be associated with a corresponding emotion of the companion 100. For example, pattern-1 may be associated with a first happiness emotion, and pattern-2 may be associated with a second type of happiness. Other emotions may be exhibited through other patterns, such as showing indifference, angriness, sadness, moodiness, etc.

Figure 6E:
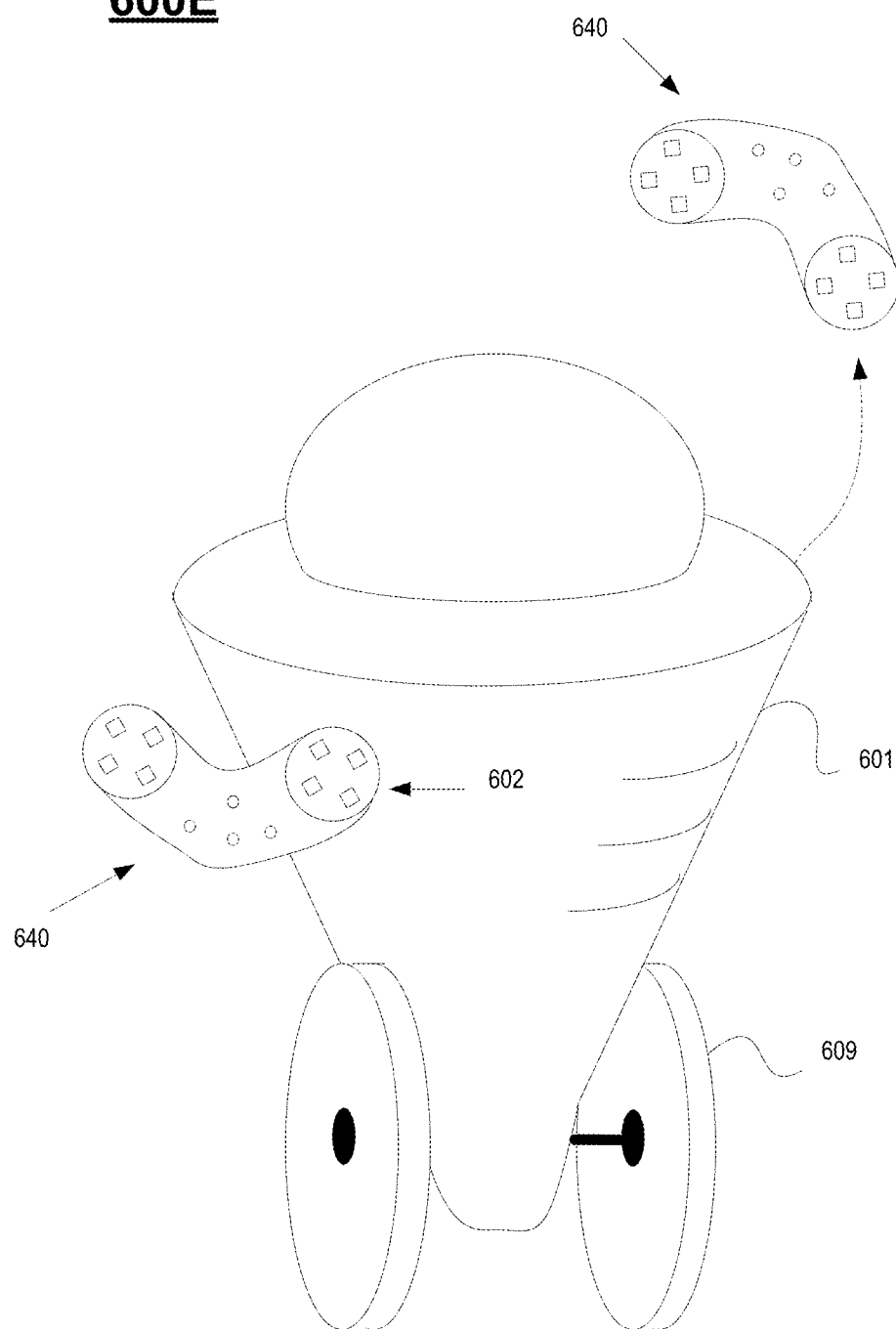
FIG. 6E illustrates an exemplary autonomous personal companion including one or more appendages, wherein the appendages may take the form of controllers, wherein the appendages/controllers may be removable from the companion, in accordance with one embodiment of the present disclosure.

FIG. 6E illustrates an exemplary autonomous personal companion 600E including one or more appendages 640, in accordance with one embodiment of the present disclosure. As shown, companion 600E has one or more features previously introduced, to include a body 601 generically represented, and means for movement (e.g., wheels 609 as shown). Other features previously introduced are not shown for purposes of clarity.

In particular, appendages 640 may provide controller functionality. For example, appendage 640 may include controller 420, and may interface with gaming console 241 for purposes of providing control instructions during the execution of a gaming application on gaming console or at a back-end server. In one embodiment, one or more of appendages 640 may be removed for easier manipulation and handling. In that manner, the user may interface with appendage 640 in the normal manner of handling a gaming controller.

In one embodiment, each appendage 640 is configured with a recharging port that is capable of coupling to a base charging port. An internal battery (not shown) is located within the corresponding appendage 640. The base charging port may be located on body 601, such as within connections associated with pivot point 602. In that manner, as the appendage 640 is replaced back onto the body 601, charging of the internal battery may occur. That is, power (e.g., electric charge) is transferred through the body 601 of companion 600E to the internal batter of appendage 640, in one embodiment. In another embodiment, power is transferred in the opposite direction, such that power is transferred from the internal battery to the companion 600E. In that manner, appendage 640 may be configured as the primary recharging medium for supplying power to companion 600E, and may be removed to be electrically and/or communicatively coupled to a base charging station separate from body 601. While appendage 640 is decoupled (e.g., recharging), companion 600E may continue to operate using an internal battery source, wherein the battery source can be recharged once appendage 640 is again coupled to body 601.

In one embodiment, appendages 640 act as arms for companion 600E. For example, appendage 640 may move about a pivot point 602 on body 601. Movement of appendage 640 may provide some communication. For instance, a pattern of movement of appendage 640 may signal a greeting by companion 600E. In another instance, appendages 640 may be extended outwards from body 601 to show a welcoming stance of companion 600E. In still another instance, an appendage 640 may be extended to provide a hand shake or first bump with a user. Other motions are contemplated. In addition, the appendages may be of any form or configuration, in other embodiments. For instance, the head or upper housing 605 configured as an appendage of the companion 600E may be detachable from the body 601.

Figure 6H:
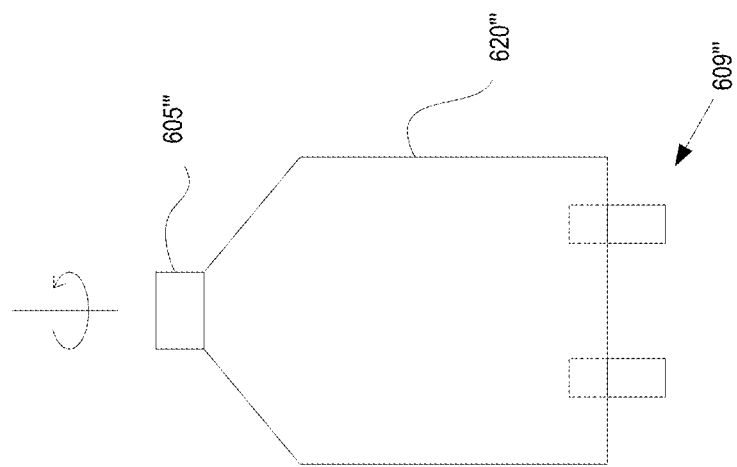
FIGS. 6F-6H illustrate alternative form factors for the autonomous personal companion, in accordance with embodiments of the present disclosure.
Figure 6G:
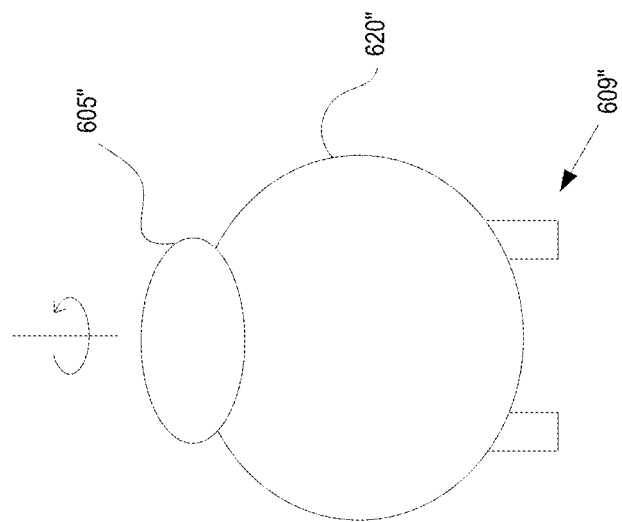
Figure 6F:
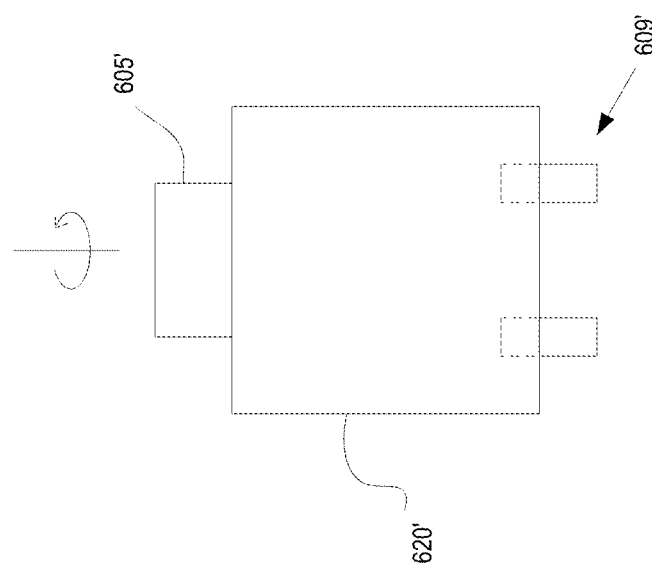

FIGS. 6F-6H illustrate alternative form factors for the autonomous personal companion, in accordance with embodiments of the present disclosure. For example, companion 600F of FIG. 6F illustrates a block form for base 620' and a block form for upper housing 605'. A means for motion is included in base 620' (e.g., wheels 609'). In addition, companion 600G of FIG. 6G illustrates a spherical form for base 620" and a spherical form for upper housing 605". Also, companion 600H of FIG. 6H illustrates a multi-faceted form for base 620'" and a block form for upper housing 605'". As shown, upper housings for each of the companions 600F-600H are independently rotatable with respect to its respective base.

In one embodiment, two autonomous personal companions 100 may communicate with each other either directly, or through a network. As an illustration, each of the companions may be performing operations related to mapping of a room in a building that requires moving around the room, wherein during their movements one or both companion may sense another companion in the proximity. The companions may further move themselves into positons for purposes of communicating with each other. In one implementation, each of the companions may be associated with a corresponding QR code. The QR code codes may be used to exchange identification information. For example, a QR code provides access to information (e.g., via a back-end server) about a corresponding companion. As such, the companions may move themselves to locations where the QR code codes may be passed (e.g., bringing a display showing a QR code of a first companion within viewing range of a camera system of a second companion). Once captured, the QR code then may be delivered to a server over a network to access identification information about the companion associated with the captured QR code. In that manner, identifying information may be exchanged between companions.

Method and System for Personalized Training of a Local AI Model Associated with a User Through Subjective and Objective Learning Accordingly, the various embodiments of the present disclosure describe systems and methods implementing deep learning (also referred to as machine learning) techniques to build an AI model personalized to a user. The local AI model is implemented through an autonomous personal companion that is mobile, wherein the autonomous personal companion is configurable to provide contextually relevant and personalized assistance to the user. The personal companion was previously introduced in FIGS. 1-6. Personalization of the local AI model is achieved by filtering subjective and/or objective input data used within a deep learning engine 190 to generate the model. If filtering is not performed, then the AI models (local and global) all would be built using the same dataset, and as such would all be the same thus having the same personality (e.g., would achieve the same results for a given input set). In that manner, local AI models are generated with varying personalities, such that each AI model can be unique and reflect or be associated with the personalities of the corresponding user.

Figure 7:
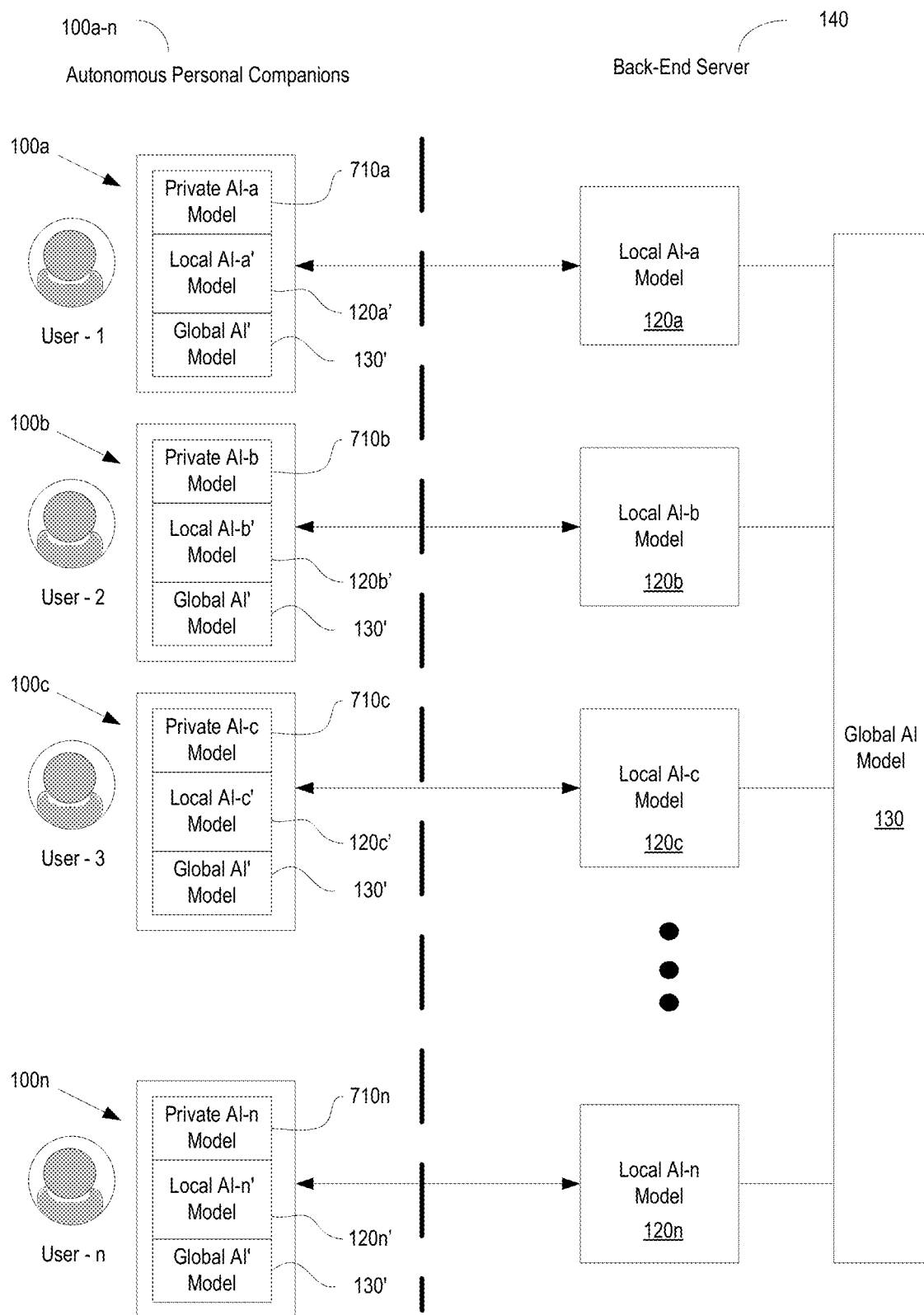
FIG. 7 illustrates various AI models for a plurality of users and the locations where those AI models may be implemented, in accordance with one embodiment of the present disclosure.

FIG. 7 illustrates various AI models for a plurality of users and the locations where those AI models may be implemented, in accordance with one embodiment of the present disclosure. The AI models are used to provide relevant and personalized assistance to corresponding users, such as through corresponding autonomous personal companions. As shown, various AI models may be located and/or implemented at a back-end server 140, previously described, wherein the server 140 is configured to provide AI modeling (e.g., through the AI engine 190) and/or application of the AI models. In addition, various AI models may be located and/or implemented at each of the autonomous personal companions 100a-n, wherein each companion is associated with a corresponding user. For example, user-1 is associated with companion 100a, user-2 is associated with companion 100b, user-3 is associated with companion 100c . . . and user-n is associated with companion 100c.

In particular, global AI model 130 is stored and accessible at back-end server 140, as previously described. Global AI model 130 is configured to predict, in part, the responses, actions, behaviors, wants and/or needs of a generic user given a particular set of inputs (e.g., that define a given scenario driven by or encountered by the user). One or more global AI models 130a-p may be generated, each of which is associated with a corresponding group of users. For example, one or more global AI models may be generated according to different demographic categories (e.g., various age groups, etc.). As such, the back-end server 140 may be configured to apply the appropriate global AI model for a given set of inputs that are provided by a corresponding companion 100 (i.e., provide the majority of processing when applying the global AI model) for a corresponding user.

As shown, a version of the global AI model 130 may also be stored locally on the autonomous personal companion side. Because a full version of the global AI model 130 may be too expansive to implement locally at a companion 100, a derivative (e.g., global AI' model) of the global AI model 130 may be stored at the companion. For example, as shown in FIG. 7, global AI' model 130' is stored at each of the companions 100a-n. In that manner, the global AI' model 130' may be implemented at the local level in response to a given set of inputs when it is more efficient to perform local processing or when a connection to the back-end server 140 is unavailable, for example to provide services to the corresponding user.

Though the global AI' model 130' is shown stored at each of the companions 100a-n, it is understood that various global AI' models may be stored at the companion. For instance, instead of or in addition to model global AI' model 130', a derivative of a global AI model that is focused on a specific group of users (e.g., fit a specific demographic profile) may be stored at a companion, whereas the full version of that global AI model is stored at back-end server 140.

In addition, for each user, a local AI model is generated and stored at the back-end server 140. The local AI model is personalized to a corresponding user, and is able to better predict, in part, the responses, actions, behaviors, wants and/or needs of a specific user given a particular set of inputs (e.g., that define a given scenario driven by or encountered by the user), when compared to the predictions provided by a global AI model 130. That is, the local AI model for the corresponding user is more personal to the user than the global AI model, such that each of the local AI models 120a-n is unique to its corresponding user. As shown, user-1 is associated with local AI-a model 120a stored at back-end server 140; user-2 is associated with local AI-b model 120*b* stored at back-end server 140; user-3 is associated with local AI-c model 120*c* stored at back-end server 140 . . . and user-n is associated with local AI-n model 120*n*, which is stored at back-end server 140.

As shown, various versions of a local AI model generated for a particular user may be stored at the back-end server and corresponding companion. As a representative example, for the full version of the local AI-a model 120*a* may be generated and stored at the back-end server. Because the full version of the local AI-a model 120*a* may be too expansive to implement locally at companion 100*a* (i.e., the full version is able to handle all the various permutations of inputs, which may be too expensive—computationally and storage wise—at the companion level), a derivative (e.g., local AI-a' model 120*a*') may be stored at the companion 100*a*. In that manner, the local AI-a' model 120*a*' may be implemented at the local level in response to a given set of inputs when it is more efficient to perform local processing or when a connection to the back-end server 140 is unavailable, for example to provide services to the corresponding user. As shown, each of the users 1-n may store a derivative version of their local AI model. For example, for user-2 derivative version local AI-b' model 120*b*' may be stored at the companion 100*b*; for user-3 derivative version local AI-c' model 120*c*' may be stored at the companion 100*c* . . . and for user-n derivative version local AI-n' model 120*n*' may be stored at the companion 100*n*.

Furthermore, at each autonomous personal companion 100, a private AI model of a corresponding user may be securely generated and stored. That is, each private AI model is private in its generation and application, and is not shared outside of its corresponding companion. In that manner, private information associated with the private AI model is confined to the corresponding companion for purposes of building the private AI model and application of the private AI model. For example, for user-1 a private AI-a model 710*a* can be locally generated and stored and applied; for user-2 a private AI-b model 710*b* can be locally generated and stored and applied; for user-3 a private AI-a model 710*c* can be locally generated and stored and applied . . . and for user-n a private AI-n model 710*n* can be locally generated and stored and applied. A more complete description of the generation and application of the private AI model is provided, in part, in relation to FIG. 8B.

Figure 8A:
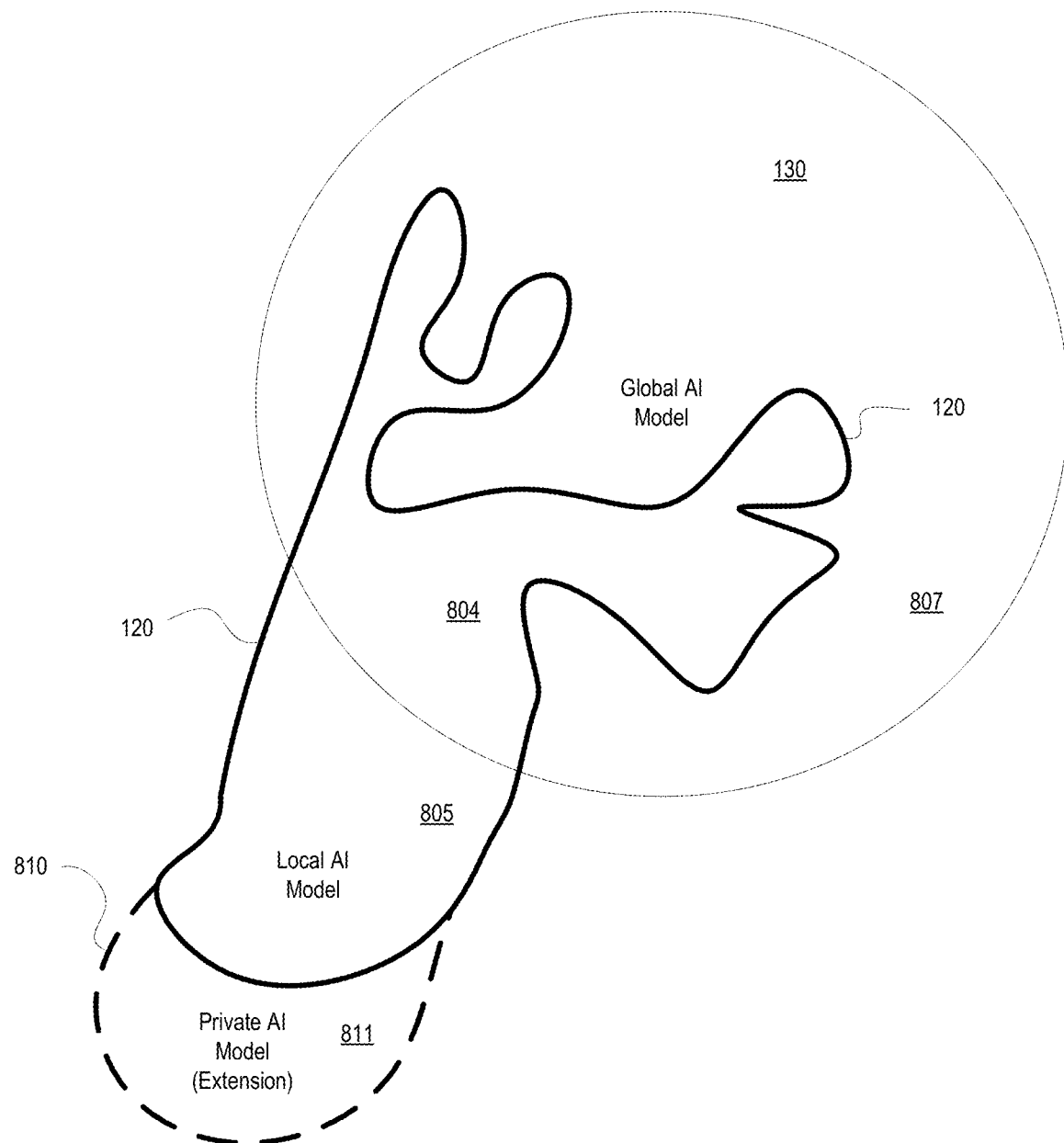
FIG. 8A illustrates the relationships between one or more AI models of a corresponding user, in accordance with one embodiment of the present disclosure.

FIG. 8A illustrates the relationships between one or more AI models of a corresponding user, in accordance with one embodiment of the present disclosure. The user is associated with a global AI model 130. As previously discussed, the global AI model may be targeted to all users, or may be targeted to a specific group of users defined by certain characteristics (e.g., by one or more demographic parameters, etc.). The global AI model is configured to predict, in part, the responses, actions, behaviors, wants and/or needs of a generic user representative of the group of users. For purposes of illustration, global AI model 130 includes a full version as shown, but may be a derivative of the full version.

However, the global AI model is not personalized to any user. In particular, a single global AI model applicable to all users without discrimination may lack or remove any unique personalities that can be tailored to corresponding users. That is, if training (e.g., applying deep learning techniques to build an AI model) were conducted using the data (e.g., operations and/or actions performed) of a single, representative user, there will be one AI model (e.g., associated with a robot or companion personality that is reflective of the corresponding user) that is generic for all users, and that does not give any surprises or differentiations between results (for a particular set of inputs). Similarly, the same local AI model would be generated for each user, if the entire data set of all users were applied when applying deep learning techniques to build the local AI models.

On the other hand, embodiments of the present invention help differentiate the local AI models for each user by filtering the data (e.g., user actions, operations, behavior, biometrics, etc.) that is used to build the models. The filtering is performed on the learned paths, patterns, objects and/or concepts provided as inputs to or resulting from the deep learning engine 190. In particular, the filtering may be performed (e.g., through random filtering, selective filtering, and/or patterned filtering).

The filtering is performed for building the AI models (e.g., local and global) without sacrificing the quality of the local or global AI models. That is, enough data is provided to build each of the individualized local AI models through deep learning, while also providing enough data to build the one or more global AI models. The data is filtered in such a manner to differentiate the dataset for each local AI model of a companion providing services to a corresponding user. In that manner, local AI models can be built that is personalized to corresponding users, wherein a local AI model defines a personality for the companion that reflects the corresponding user. In particular, each local AI model is able to predict, in part, the responses, actions, behaviors, wants and/or needs of the user in association with a certain set of inputs (e.g., scenarios experienced by the user or driven by the user).

As shown in FIG. 8A, a local AI model 120 includes the learned paths and/or learned patterns for a given set of inputs and/or input data (e.g., scenario experienced or driven by the user) that relate to a corresponding user. As previously described, the user input data may be related to any action, characteristic, biometric, response, behavior, etc. that may be helpful in defining how, in part, the local AI model should respond to certain inputs. This data may be monitored passively or actively (e.g., user responding to queries). As such, the local AI model of a corresponding user is able to predict, in part, especially within a given environment or scenario experienced or driven by the user, the responses, actions, behaviors, wants and/or needs of the user for a given set of inputs.

As shown, the local AI model 120 includes learned paths and/or learned patterns that are also included within the global AI model 130. For example, the learned paths and/or learned patterns located in region 804 are found in both the local AI model 120 and the global AI model 130. Without more differentiation, the local AI model 120 would have the same personality as the global AI model 130. Personality is generated through random, selective, and/or patterned filtering of the learned paths, patterns, objects and/or concepts provided as inputs to or resulting from the deep learning engine 190, as previously described. As such, the dataset used to build the local AI model would be different than the dataset used to build a global AI model, which results in different learned paths and patterns. In one case, the local AI model 120 includes a filtered set of learned paths and/or learned patterns found in the global AI model 130. That is, the local AI model 120 does not include the learned paths and/or learned patterns found in region 807, wherein those learned paths and/or patterns are used within the global AI model 130. As such, limiting the global knowledge base (e.g., by restricting use of paths/patterns in region 807) promotes curiosity of the deep learning or AI techniques implemented when building an AI model.

Further, the local AI model 120 includes learned paths and/or learned patterns that are not found in the global AI model 130. In particular, the learned paths and/or learned patterns located in region 805 are found in the local AI model 120, but not the global AI model 130. Additionally, the dataset used to build a first local AI model of a first user would be different than the dataset used to build a second local AI model of a second user. In that case, the personality of a first autonomous personal companion of the first user would be different than the personality of a second autonomous personal companion of the second user.

In addition, a private AI model 810 of the user may be generated using data that is localized to the corresponding companion. Monitored private data that is captured by the companion, is also processed through a local AI engine 110 to build the private AI model 810. That is, the private data remains private and confined to the boundaries of the companion 100. For instance, the private data is not delivered over a network to other devices. As such, the private AI model 810 is also not delivered to the back-end server 140 for storage. In one embodiment, the private AI model 810 is an extension of the local AI model 120. For example, the learned paths and/or learned patterns located in region 811 are found in the private AI model 810 but not the local AI model 120. That is, the dataset used to build the private AI model is different than the dataset used to build the local AI model. In a way, the personality of the companion as implemented through the private AI model is different, and may be more distinct, than the personality as implemented through the local AI model.

In one embodiment, the data collected from "similar" users may be used as a base when building local AI models for these similar users, so that any one of the personalities defined by the corresponding local AI model does not go beyond the expectations of these users. As such, the data collected from or associated with similar users used for building a local AI model of a corresponding user helps to constrain the boundaries of the local AI model, such that the model does not become so unique that it strays too far from the expectations of the user (e.g., becomes too specific that it no longer resembles any recognizable personality). In that manner, the local AI model may give a personality to the corresponding companion providing services to the corresponding user. The local AI model reflects characteristics of the user, such that the local AI model can predict, in part, the responses, actions, behaviors, wants and/or needs of the user for a given set of inputs.

In another embodiment, because the dataset used to build the local AI model is different than the dataset used to build the global AI model, each AI model would have distinct knowledge bases from which to build the respective AI models. As previously described, limiting the global knowledge base promotes curiosity when performing deep learning to build an AI model. In particular, because the knowledge bases are different, a different set of queries would be performed when applying deep learning or AI to build the local AI model than when building the global AI model. That is, a first set of queries would be used to build the local AI model, and a second set of queries would be used to build the global AI model. This would result in different personalities associated with the local AI model and the global AI model, and would result in different personalities associated with the local AI models of different users.

In one embodiment, a first user may use a companion that is configured for a different user (e.g., a second user). For example, the first user may conduct a trial of the companion, to see whether the personality of that companion (trained for a different user—e.g., the second user) is also compatible with the tastes, desires, wants and/or needs of the first user. The first user may sample any number of personalities before selecting a particular personality to be implemented within his or her companion. That personality as implemented through a corresponding local AI model, may provide a base AI model from which additional features are included (in an updated local AI model) thereby further shaping the personality to reflect the first user.

Figure 8B:
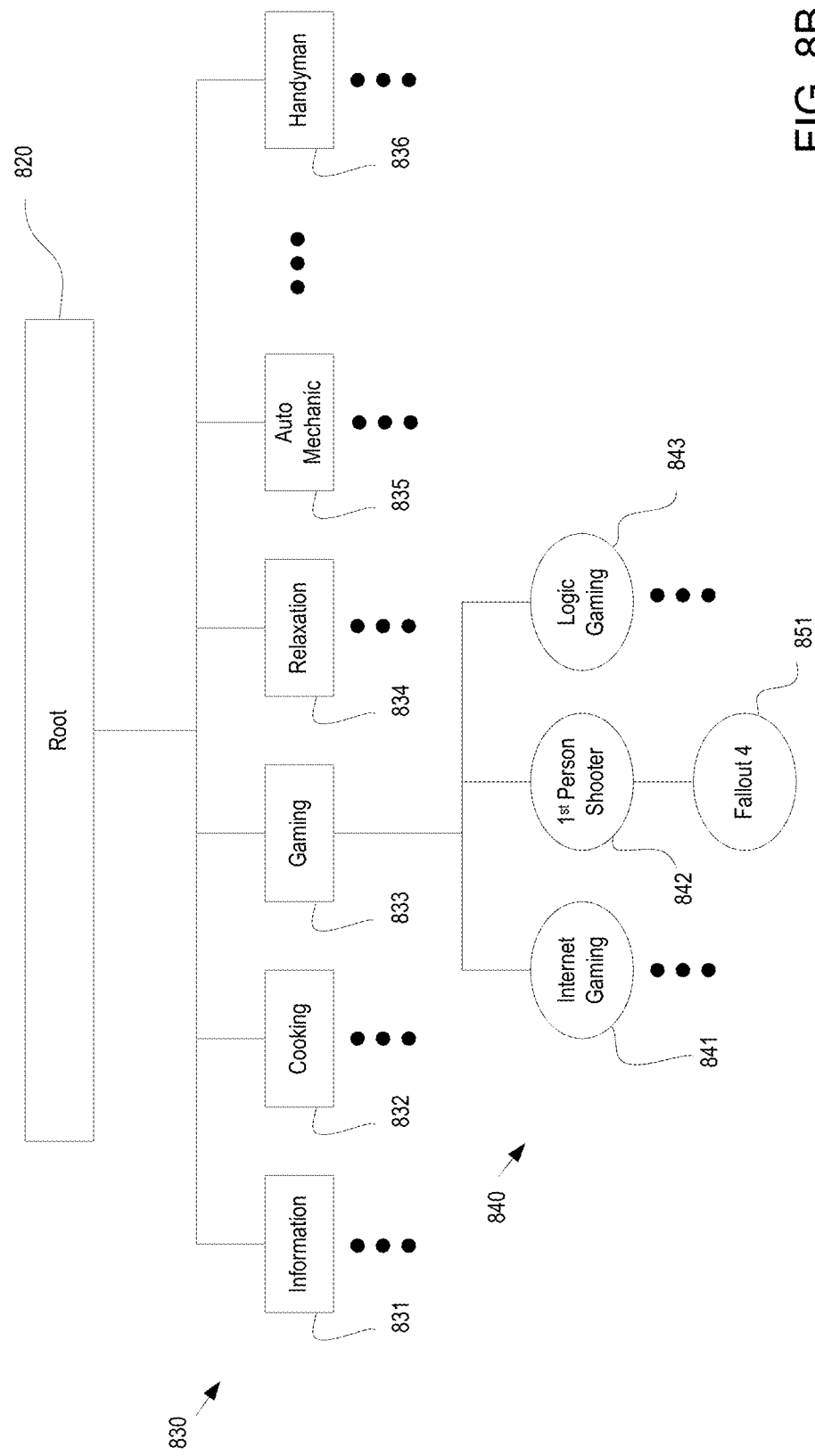
FIG. 8B illustrates the variety of branches defined within an AI model of a corresponding user, wherein each branch may lead to sub-AI models of the user, in accordance with one embodiment of the present disclosure.

FIG. 8B illustrates the variety of branches in a hierarchy defined within a local AI model 120 of a corresponding user, wherein each branch may lead to sub-AI models of the user, in accordance with one embodiment of the present disclosure. That is, the leaf nodes at the ends of branches may define a particular sub-AI model of the user, wherein the sub-AI model defines the learned paths and/or patterns for a specific set of inputs that describe a specific scenario experienced by or driven by the user. Though FIG. 8B shows an exemplary hierarchy, other embodiments support various other hierarchy configurations, to include the mixing of layers, generating sub-layers, sharing nodes between layers, etc.

In particular, the local AI model 120 includes a root layer 820 that defines the learned paths and/or patterns that are consistent with any of the sub-AI models found in the lower nodes of the model hierarchy. For instance, the root layer 820 may provide a base personality and/or base knowledge for the local AI model 120 from which sub-AI models may build upon.

The model hierarchy includes multiple layers below the root layer 820 that may further define the personality as reflected by the local AI model 120. For example, the second layer 830 may define various interests of the user. The second layer 830 shows different aspects of the personality of the user, such as a cooking personality or handyman personality. In particular, node 831 may define the learned paths and/or patterns associated with information that is of interest to the user; node 832 may define the learned paths and/or patterns associated with cooking scenarios of interest to the user; node 833 may define the learned paths and/or patterns associated with various gaming interests of the user; node 834 may define the learned paths and/or patterns associated with relaxation techniques of interest to the user; node 835 may define the learned paths and/or patterns associated with various cooking topics of interest to the user; and node 836 may define the learned paths and/or patterns associated with various remodeling or construction topics of interest to the user. The nodes in the second layer 830 are shown for illustration, and other nodes are supported within the hierarchy of local AI model 120.

Each of the nodes in the second layer 830 may include additional branches leading to lower nodes that further define the personality as reflected by the local AI model 120. Not all branches are shown for purposes of brevity and clarity. However, for illustration, the gaming node 833 is shown to include various lower layers. For example, the third layer 840 may include additional nodes that further define the gaming personality as reflected by gaming node 833. In particular, leaf node 841 may define the learned paths and/or patterns associated with scenarios related to internet gaming (e.g., online poker, social networking games, etc.). Various other lower branches and/or nodes may be defined in association with internet gaming node 841. In addition, leaf node 843 may define the learned paths and/or patterns associated with scenarios related to logic games (e.g., crossword, chess, go, etc.). Also, leaf node 842 may define the learned paths and/or patterns associated with scenarios related to Pt person shooter games (e.g., video games shown through a first person point-of-view that typically involves weapon-based or hand-to-hand combat).

As shown, additional branches and/or nodes may further define the personality as reflected by the Pt person shooter leaf node 842. For example, node 851 may define the learned paths and/or patterns associated with scenarios related to the Pt person shooter game Fallout 4 that is of particular interest to the user. As an illustration, the user may have previously requested help in passing a particular level within the gaming application. The learned paths and/or patterns may be associated with the assistance provided, as well as anticipated assistance for passing higher levels of the gaming application to be encountered by the user.

Figure 9A:
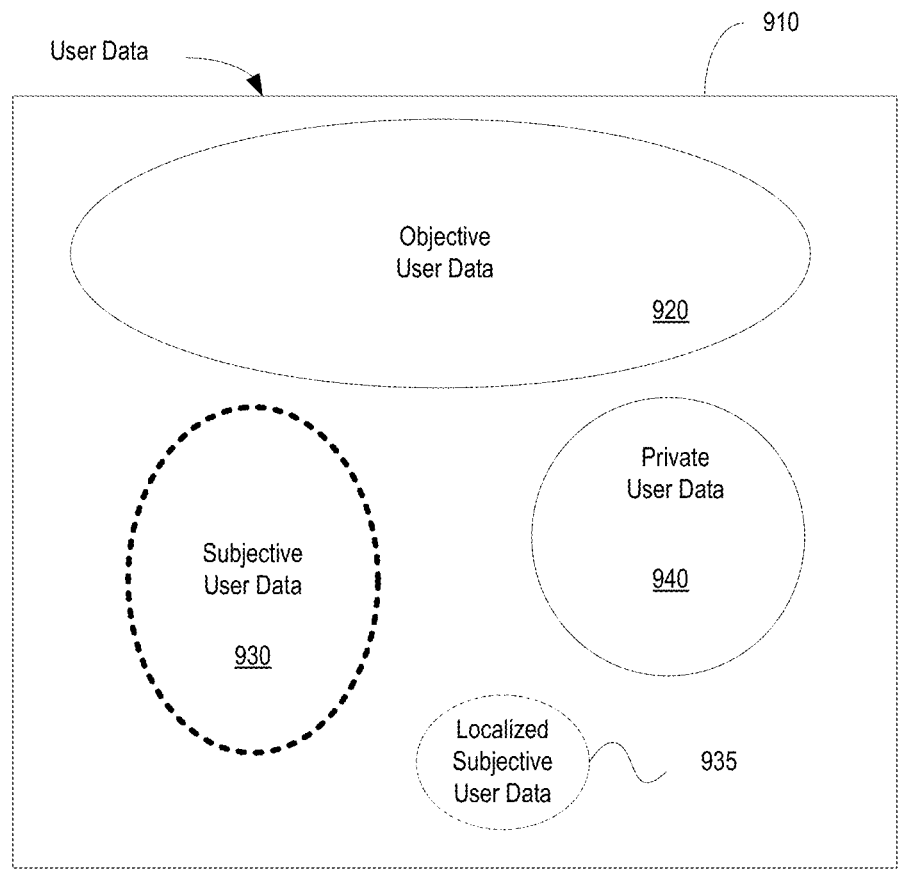
FIG. 9A illustrates the different types of user actions that may be monitored for a corresponding user, in accordance with one embodiment of the present disclosure.

FIG. 9A illustrates the different types of data that may be monitored for a corresponding user, in accordance with one embodiment of the present disclosure. As previously described, the data may be related to any action, characteristic, biometric, response, behavior, sensory data, etc. of the user that may be helpful in defining how, in part, the local AI model of the corresponding user should respond to certain inputs. This data may be monitored passively or actively (e.g., user responding to queries). In addition, the data is used by a deep learning engine (e.g., engine 190) for building an AI model. As such, the local AI model of a corresponding user is able to predict, in part, especially within a given environment or scenario experienced or driven by the user, the responses, actions, behaviors, wants and/or needs of the user for a given set of inputs.

As shown, the user data 910 includes one or more types of data, of which four classes are shown, but more may be defined. The four classes of user data 910 include objective user data 920, subjective user data 930, localized subjective user data 935, and private user data 940. The user data 910 is input into a deep learning engine to build the global AI model 130, the local AI model 120 of a corresponding user, and any derivatives of those AI models.

In particular, the objective data 920 is associated with various actions, responses, behaviors, etc. of a plurality of users. The objective data is collected and shared with the deep learning engine 190 of the back-end server 140 (e.g., shared to the cloud) to form a pool of shared intelligence that can then be used to build the global AI model 130, and any of its derivatives.

In addition, user data 910 includes subjective user data 930, which is used to give unique personalities to an autonomous personal companion, wherein a companion is associated with a particular user. That is, subjective user data 930 associated with a particular user is used for individualized learning or training when building a local AI model, as implemented through a corresponding companion, wherein the gives a unique personality for the companion when providing services to the corresponding user. The personality of a companion may be reflective of the corresponding user, such that the local AI model defining that personality is configured to predict, in part, the responses, actions, behaviors, wants and/or needs of the corresponding user for any given set of inputs (e.g., previously encountered set of inputs or extrapolated set of inputs).

In one embodiment, the subjective user data is shared with a back-end server 140 for purposes of building the corresponding local AI model 120 of a corresponding user. The subjective user data is not further shared to build either the global AI model 130, or for building any of the local AI models of any other user. As such, the subjective user data may be delivered to the back-end server in order for better utilization of resources. For example, it may be more efficient to build the local AI model using the subjective user data at the back-end server because it may be too computationally expensive to perform the AI operations at the local level (e.g., at the companion 100).

Further, user data 910 includes localized subjective user data 935, which is used to build the private AI model (e.g., model 810), previously introduced. The localized subjective user data 935 is not shared over a network, for example to the back-end server 140; and instead is confined or localized to the boundary of the companion 100. In that manner, the localized subjective user data 935 along with at least a portion of the subjective user data 930 can be used to build the private AI model using a deep learning engine (e.g., engine 110) on the companion 100. The private AI model implements a unique personality of the companion that is not shared outside of the companion, so that personality remains unique and cannot be mirrored or used to build any other local or global AI model.

In addition, the user data 910 includes private user data 940. This data is not used for building any local or global AI model. In one embodiment, the private user data is automatically identified. In another embodiment, the private user data is identified through user action. For example, the user may provide instructions to the corresponding companion 100 that labels a particular item of data as secure. However the data is identified as being private data 940, in one embodiment, the secure data is not shared over a network. In addition, the private data 940 is removed from the memory of the companion either automatically or through user instruction which may be backed up with automatic removal.

Figure 9B:
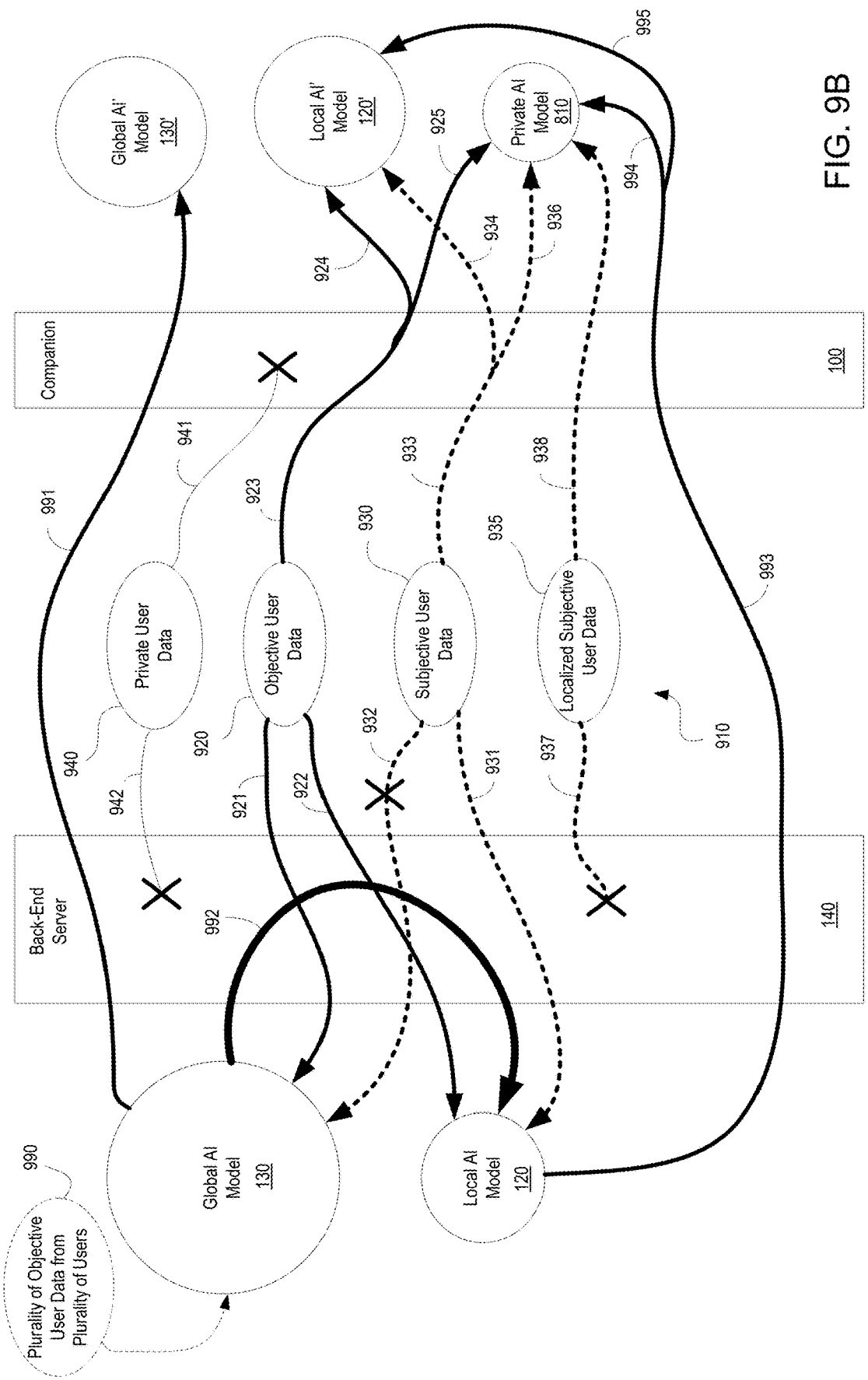
FIG. 9B illustrates how various AI models are built using the different types of user actions introduced in FIG. 9A, in accordance with one embodiment of the present disclosure.

FIG. 9B illustrates how various AI models are built using the different types of user data introduced in FIG. 9A, in accordance with one embodiment of the present disclosure. In particular, FIG. 9B illustrates the sharing of the various classes of user data 910 between the back-end server 140 and the companion 100. For example, a local AI engine 110 may be implemented at a companion 100 of a corresponding user for building and/or implementing a local AI model, a private AI model and/or a global AI model. In addition, an AI engine 190 may be implemented at the back-end server 140, for example, for building and/or implementing a local AI model and/or a global AI model.

Various monitored user data 910 is also shown. The user data associated with a corresponding user is monitored, such as through the corresponding companion 100. The data 910 includes objective user data 920 (used for building a global AI model 130), subjective user data 930 (e.g., used for building a local AI model 120), localized subjective user data 935 (e.g., used for building a private AI model 810, and private user data 940 (e.g., not used for building any AI model).

For example, private user data 940 may be monitored at the companion 100. However, because the data is private, it is not used as input data to build any local AI engine or global AI engine. This is indicated by the discontinued pathways 941 and 942 (e.g., does not reach the AI engine 190 and does not reach the AI engine 110) along which the private user data 940 flows. In addition, the private user data 940 may be removed (e.g., erased from memory) from the companion 100.

In addition, objective user data 920 associated with the user is monitored at the companion. The objective user data 920 is shared with back-end AI engine 190 along pathway 921 for purposes of building the global AI model 130. In particular, objective user data 920 is combined with a plurality of user data 990 from a plurality of users and input into the AI engine 190 for purposes of building the global AI model 130. The global AI model 130 or a derivative (e.g., global AI' model 130') may be transferred to the companion 100 along pathway 991.

The objective user data 920 may also be shared with back-end AI engine 190 along pathway 922 for purposes of building the local AI model 120. In addition, portions of the global AI model 130 may be used to build the local AI model 120 in the AI engine 190, as shown by pathway 992. The local AI model 120 or a derivative (e.g., local AI' model 120') may be transferred to the companion 100 along pathways 993 and 995. It is understood that the AI engines at the companion 100 and the back-end server 140 may cooperate in building the local AI model 120 and any of its derivatives 120'. For example, the objective user data 920 may also be shared along pathways 923 and 924 with the AI engine 110 at the companion 100 for building the local AI model 120 or its derivative local AI' model 120'.

Subjective user data 930 associated with the user is also monitored at the companion 100, as previously described. The subjective user data 930 may be shared along pathway 931 with back-end AI engine 190 for purposes of building the local AI model 120. That is, the local AI model 120 is built in part using objective data from the user as well as objective data from a plurality of users (e.g., through the import of portions of the global AI model 130). In addition, the subjective user data 930 may be implemented at the AI engine 110 of companion 100 along pathway 993 and 934 for purposes of building at least a portion of the local AI model 120, or its derivative 120'. As shown, the subjective user data 930 is not used to build the global AI model 130, which is indicated by the discontinued pathway 932.

In addition, localized subjective user data 935 associated with the user is also monitored at companion 100, as previously described. However, because the localized subjective user data is confined within the boundary of the companion 100, it is not used as input data to build the local AI model 120, which is indicated by the discontinued pathway 937 (e.g., does not reach AI engine 190 at the back-end server 140). On the other hand, localized subjective user data 935 is implemented within the AI engine 110 of the companion 100 for purposes of building the private AI model 810. In particular, subjective user data 930 (e.g., along pathways 933 and 936) is combined with localized subjective user data 935 (e.g., along pathway 938, and may use at least a portion of the local AI model 120 delivered along pathways 993 and 994 to build the private AI model 810.

Figure 10:
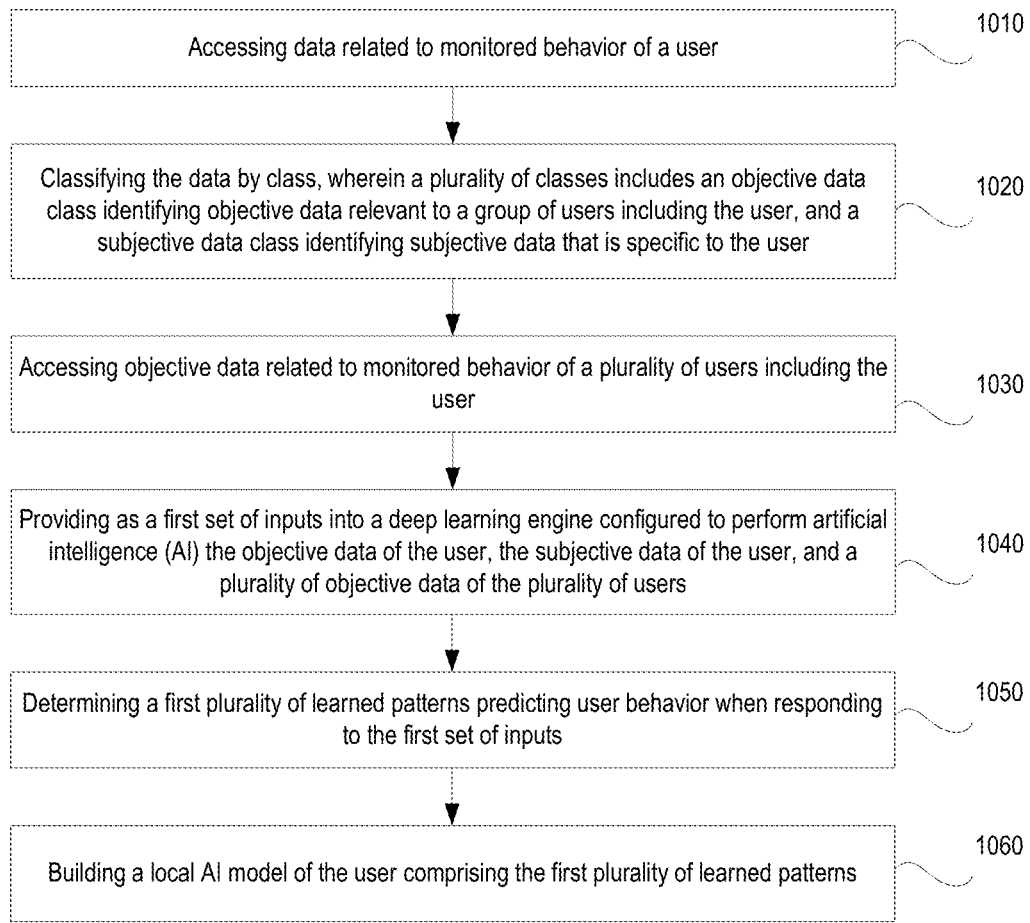
FIG. 10 is a flow diagram illustrating a method for building an AI model of a corresponding user, in accordance with one embodiment of the present disclosure.

With the detailed description of the various modules of the one or more AI engines communicating over a network, flow diagram 1000 of FIG. 10 discloses a method for building a global AI model and a local AI model for implementation by an autonomous personal companion providing services to a corresponding user, in accordance with one embodiment of the disclosure. Flow diagram 1000 may be implemented within a companion 100 (e.g., within AI engine 190), previously described and/or a back-end server 140 (e.g., within AI engine 110), previously described.

In particular, at 1010 the method includes accessing data related to monitored behavior of a user, wherein the behavior includes any action, responses, emotion, lack of action, appearance, biometric, etc. related to the user. For example, the data includes at least one of gaming controller inputs, computer inputs, computer operations, textual queries, textual responses, verbal queries, verbal responses, body cues, biometrics, user actions, eye movement, and verbal communication. The data may be captured by a companion associated with the user, or by any monitoring system that is communicatively coupled to the companion.

At 1020, the method includes classifying the data by class. As previously described, the plurality of classes includes an objective data class identifying objective data relevant to a group of users including the user, and a subjective data class identifying subjective data that is specific to the user. In addition, the classes may include a localized subjective data class identifying localized subjective data that is specific to the user, and is confined to the boundary of the companion 100. In that manner, the localized subjective data is used to build a private AI mode, but not used to build a local AI model 120, both of which correspond to the user.

In one embodiment, a secure data class within the plurality of classes identifies private user data which is not used for building any local or global AI model. The secure data is highly sensitive, and as such, should not be used to build any local or global AI model. In addition, the secure data should not be shared with the AI engines at a back-end server over a network, or internally with an AI engine of the companion. That is, the secure data is restricted from being used to build any local or global AI model. As such, in one embodiment, the secure data is removed from the companion. As an illustration, secure data may include data that may place the user in any number of compromising positions. The secure data may be a highly confidential telephone conversation that if revealed or released may embarrass the user.

In one embodiment, the user may send a first instruction to classify some portion of captured as being secure data. The instruction may be received at the companion of the user and/or by the back-end server. In addition, a second instruction from the user may also be received. The second instruction may command the removal of the secure data, and as such, any trace of the secure data is deleted, for example from the memory of the companion.

At 1030, the method includes accessing objective data related to monitored behavior of a plurality of users, wherein the plurality includes the user introduced above, the user being associated with the companion providing services. The objective data of the user may be shared with a back-end server configured to collect objective data from a plurality of users. In that manner, the objective data of the plurality of users forms a shared pool of shared intelligence that can be used to build a global AI model, and build at least a portion of a local AI model corresponding to the user.

At 1040, the method includes providing as a first set of inputs into a deep learning engine configured to perform artificial intelligence the objective data of the user, the subjective data of the user, and the objective data of the plurality of users. As previously described, the deep learning engine implements AI techniques to learn everything about the user, especially when the user is encountering or driving a scenario in an environment, wherein the scenario is described by input parameters.

At 1050, the method includes determining a first plurality of learned patterns and or paths that predict user behavior when responding to the first set of inputs, or any input or group of inputs within the first set. In particular, the learned patterns can predict, in part, the responses, behaviors, actions, wants and/or needs of a user for a given set of inputs that describe a scenario in an environment of the user. More specifically, at 1060, the method includes building a local AI model of the user including the first plurality of learned patterns.

In one embodiment, the method includes providing as a second set of inputs into the deep learning engine the objective data of the plurality of users, wherein the plurality includes the user introduced above that is associated with the companion. In one embodiment, the second set of inputs does not include subjective data of any user in the plurality of users. A second plurality of learned patterns is determined based on the second set of inputs. In particular, the second plurality of learned patterns predict the behavior of a generic user when responding to or experiencing a scenario described by the second set of inputs or input parameters. The deep learning engine is configured to build a global AI model that includes the second plurality of learned patterns. That is, the global AI model can be used to predict the in part, the responses, behaviors, actions, wants and/or needs of a generic user for a given set of inputs that describe a scenario encountered by or driven by the generic user.

In still another embodiment, the method includes classifying a portion of the data of the user as localized subjective data. That is, the plurality of classes includes a localized subjective data class, as previously described. In addition, a third set of inputs is provided to the deep learning engine (e.g., as inputs), wherein the inputs includes the objective data of the user, the subjective data of the user, the localized subjective data of the user, and the objective data of the plurality of users. A third plurality of learned patterns is determined based on the third set of inputs. In particular, the third plurality of learned patterns predict the behavior of the user when responding to or experiencing specific scenarios described by the third set of inputs or input parameters. The deep learning engine is configured to build a private AI model that includes the third plurality of learned patterns. That is, the private AI model can be used to predict the in part, the responses, behaviors, actions, wants and/or needs of a generic user for a given set of inputs that describe the specific scenarios encountered by or driven by the user and as described by the third set of inputs or input parameters.

In one embodiment, the localized subjective data is not used or restricted from being used when building the local AI model of the user. For instance, the localized subjective data of the user is not shared outside of the boundary of the companion. More particularly, the localized subjected data is prevented from being delivered over a network coupled to the companion. In this manner, there is a differentiation between the local AI model and the private AI model of the user. As such, the private AI model as created and stored at the companion can provide detailed personal services that are very specific to the user, and cannot be found in any other local AI model of any other user. This ensures a unique personality of the companion that cannot be tainted or influenced by other data (even some subjective data of the user).

Accordingly, the present disclosure described systems and methods implementing deep learning (also referred to as machine learning) techniques to build an AI model personalized to a user, in various embodiments.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:
   building a local artificial intelligence (AI) model that determines a first plurality of learned patterns for predicting behavior of a user based on:
   randomly filtered objective data of the user that represents monitored behavior of the user, wherein the objective data of the user is shared among a plurality of users,
   subjective data of the user that represents monitored behavior of the user and is confined to the user, and a randomly filtered plurality of objective data of the plurality of users that represents monitored behavior of the plurality of users, wherein the plurality of objective data is shared among the plurality of users;

capturing private data of the user at an autonomous personal companion, wherein the private data is confined to the autonomous personal companion for internal use;

building a private AI model of the user at the autonomous personal companion based on the first plurality of learned patterns of the local AI model and the private data of the user; and storing the private AI model at the autonomous personal companion of the user for execution by the autonomous personal companion.

2. The method of claim 1, further comprising:
receiving a query related to the private data; and
executing the private AI model at the autonomous personal companion to answer the query.

3. The method of claim 1, wherein the building the private AI model includes:
providing the first plurality of learned patterns of the local AI model and the private data of the user as a set of inputs into a deep learning engine configured to perform artificial intelligence;
determining a second plurality of learned patterns predicting behavior of the user when responding to the set of inputs; and
building the private AI model based on the second plurality of learned patterns.

4. The method of claim 1, wherein the building the local AI model of the user includes:
providing a set of inputs into a deep learning engine configured to perform artificial intelligence, wherein the set of inputs includes the randomly filtered objective data, the subjective data of the user, and the randomly filtered plurality of objective data of the plurality of users;
determining the first plurality of learned patterns predicting behavior of the user when responding to the set of inputs by the deep learning engine; and
building the local AI model based on the first plurality of learned patterns.

5. The method of claim 4, wherein the local AI model is built at a back-end server.

6. The method of claim 1, further comprising:
restricting storage of the private AI model to the autonomous personal companion; and
preventing external access of the private AI model.

7. The method of claim 1, further comprising:
receiving an instruction, generated based at least on an interaction with a user interface, that a portion of the private data of the user is secure data; and
preventing use of the portion of the private data when performing the building of the private AI model.

8. The method of claim 1, further comprising:
classifying a portion of the private data as secure data; and
preventing use of the portion of the private data when performing the building of the private AI model.

9. A computer system comprising:
a processor; and
memory coupled to the processor and having stored therein instructions that, if executed by the computer system, cause the computer system to execute a method comprising:
building a local artificial intelligence (AI) model that determines a first plurality of learned patterns for predicting behavior of a user based on:
randomly filtered objective data of the user that represents monitored behavior of the user, wherein the objective data of the user is shared among a plurality of users,
subjective data of the user that represents monitored behavior of the user and is confined to the user, and
a randomly filtered plurality of objective data of the plurality of users that represents monitored behavior of the plurality of users, wherein the plurality of objective data is shared among the plurality of users;
capturing private data of the user at an autonomous personal companion, wherein the private data is confined to the autonomous personal companion for internal use;
building a private AI model of the user at the autonomous personal companion based on the first plurality of learned patterns of the local AI model and the private data of the user; and
storing the private AI model at the autonomous personal companion of the user for execution by the autonomous personal companion.

10. The computer system of claim 9, the method further comprising:
receiving a query related to the private data; and
executing the private AI model at the autonomous personal companion to answer the query.

11. The computer system of claim 9, wherein in the method the building the private AI model includes:
providing the first plurality of learned patterns of the local AI model and the private data of the user as a set of inputs into a deep learning engine configured to perform artificial intelligence;
determining a second plurality of learned patterns predicting behavior of the user when responding to the set of inputs; and
building the private AI model based on the second plurality of learned patterns.

12. The computer system of claim 9, wherein in the method the building the local AI model of the user includes:
providing a set of inputs into a deep learning engine configured to perform artificial intelligence, wherein the set of inputs includes the randomly filtered objective data, the subjective data of the user, and the randomly filtered plurality of objective data of the plurality of users;
determining the first plurality of learned patterns predicting behavior of the user when responding to the set of inputs by the deep learning engine; and
building the local AI model based on the first plurality of learned patterns.

13. The computer system of claim 9, the method further comprising:
restricting storage of the private AI model to the autonomous personal companion; and
preventing external access of the private AI model.

14. The computer system of claim 9, the method further comprising:
receiving an instruction that a portion of the private data of the user is secure data; and
preventing use of the portion of the private data when performing the building of the private AI model.

15. The computer system of claim 9, the method further comprising:
classifying a portion of the private data as secure data; and
preventing use of the portion of the private data when performing the building of the private AI model.

16. A non-transitory computer-readable medium storing a computer program for implementing a method, the computer-readable medium comprising program instructions for:
building a local artificial intelligence (AI) model that determines a first plurality of learned patterns for predicting behavior of a user based on:
randomly filtered objective data of the user that represents monitored behavior of the user, wherein the objective data of the user is shared among a plurality of users,
subjective data of the user that represents monitored behavior of the user and is confined to the user, and
a randomly filtered plurality of objective data of the plurality of users that represents monitored behavior of the plurality of users, wherein the plurality of objective data is shared among the plurality of users;
capturing private data of the user at an autonomous personal companion, wherein the private data is confined to the autonomous personal companion for internal use;
building a private AI model of the user at the autonomous personal companion based on the first plurality of learned patterns of the local AI model and the private data of the user; and
storing the private AI model at the autonomous personal companion of the user for execution by the autonomous personal companion.

17. The non-transitory computer-readable medium of claim 16, further comprising program instructions for:
receiving a query related to the private data; and
executing the private AI model at the autonomous personal companion to answer the query.

18. The non-transitory computer-readable medium of claim 16, wherein the program instructions for building the private AI model includes program instructions for:
providing the first plurality of learned patterns of the local AI model and the private data of the user as a set of inputs into a deep learning engine configured to perform artificial intelligence;
determining a second plurality of learned patterns predicting behavior of the user when responding to the set of inputs; and
building the private AI model based on the second plurality of learned patterns.

19. The non-transitory computer-readable medium of claim 16, further comprising program instructions for:
restricting storage of the private AI model to the autonomous personal companion; and
preventing external access of the private AI model.

20. The non-transitory computer-readable medium of claim 16, further comprising program instructions for:
classifying a portion of the private data as secure data; and
preventing use of the portion of the private data when performing the building of the private AI model.

* * * * *